(12) United States Patent
Gass et al.

(10) Patent No.: US 8,291,797 B2
(45) Date of Patent: *Oct. 23, 2012

(54) TABLE SAW WITH IMPROVED SAFETY SYSTEM

(75) Inventors: Stephen F. Gass, West Linn, OR (US); David A. Fanning, Vancouver, WA (US)

(73) Assignee: SD3, LLC, Tualatin, OR (US)

( * ) Notice: Subject to any disclaimer, the term of this patent is extended or adjusted under 35 U.S.C. 154(b) by 2 days.

This patent is subject to a terminal disclaimer.

(21) Appl. No.: 12/807,146

(22) Filed: Aug. 27, 2010

(65) Prior Publication Data

US 2011/0056351 A1    Mar. 10, 2011

Related U.S. Application Data

(63) Continuation of application No. 11/796,819, filed on Apr. 30, 2007, now Pat. No. 8,079,292, which is a continuation of application No. 09/929,426, filed on Aug. 13, 2001, now Pat. No. 7,210,383, application No. 12/807,146, which is a continuation of application No. 12/655,695, filed on Jan. 4, 2010, now Pat. No. 8,006,595, which is a continuation of application No. 11/975,985, filed on Oct. 22, 2007, now Pat. No. 7,640,835, which is a continuation of application No. 09/929,221, filed on Aug. 13, 2001, now Pat. No. 7,284,467, application No. 12/807,146, which is a continuation of application No. 12/002,388, filed on (Continued)

(51) Int. Cl.
*B23Q 15/00* (2006.01)

(52) U.S. Cl. ............. 83/63; 83/DIG. 1; 83/72; 83/76.1; 83/76.8; 83/370; 192/129 R

(58) Field of Classification Search ............... 83/DIG. 1, 83/58, 62, 62.1, 63, 72, 76.7, 788, 581, 471.2, 83/477.1, 477.2, 522.12, 526, 397.1; 144/154.5, 144/356, 384, 391, 427, 286.5; 29/708, 254, 29/413; 324/550, 424; 408/5; 56/10.9, 11.3; 192/192 A, 129 R, 130; 102/202.7; 89/1.56; 137/68.12, 72, 76; 188/5, 6, 110, 189; 169/57, 169/59, 42, DIG. 3; 74/2; 403/2, 28; 411/2, 411/39, 390; 335/1, 242, 132; 318/362; 241/32.5; 337/239, 148, 1, 5, 10, 17, 140, 337/170, 190, 237, 401, 290, 404, 405; 218/2, 218/154; 307/639, 328, 115, 326, 142, 117, 307/126, 131; 451/409; 280/806; 297/480; 187/69, 77, 89, 189, 216, 166, 72.3; 340/679, 340/680, 686.1, 687, 686.3, 686.6

See application file for complete search history.

(56) References Cited

U.S. PATENT DOCUMENTS 1,582,483 A    4/1926    Runyan
(Continued)

FOREIGN PATENT DOCUMENTS

CH    297525    6/1954
(Continued)

OTHER PUBLICATIONS

Skil Model 3400-Type 1 10" Table Saw Parts List and Technical Bulletin, S-B Power Tool Company, Jun. 1993.

(Continued)

*Primary Examiner* — Jason Daniel Prone

(57) ABSTRACT

A table saw having a reaction system configured to take a predetermined action to mitigate injury upon detection of a dangerous condition is disclosed. The reaction system has a component in a predetermined orientation relative to the blade and the component is configured to maintain its orientation relative to the blade as the blade is raised and lowered.

5 Claims, 13 Drawing Sheets

Related U.S. Application Data

Dec. 17, 2007, now Pat. No. 8,011,279, which is a continuation of application No. 09/929,227, filed on Aug. 13, 2001, now Pat. No. 7,308,843, application No. 12/807,146, which is a continuation of application No. 11/401,050, filed on Apr. 10, 2006, now Pat. No. 7,788,999, which is a continuation of application No. 09/929,240, filed on Aug. 13, 2001, now Pat. No. 7,100,483, and a continuation of application No. 09/929,241, filed on Aug. 13, 2001, now Pat. No. 7,024,975, and a continuation of application No. 09/929,425, filed on Aug. 13, 2001, now Pat. No. 7,137,326, and a continuation of application No. 10/172,553, filed on Jun. 13, 2002, now Pat. No. 7,231,856, and a continuation of application No. 10/189,027, filed on Jul. 2, 2002, now Pat. No. 7,712,403, and a continuation of application No. 10/243,042, filed on Sep. 13, 2002, now Pat. No. 7,197,969, and a continuation of application No. 10/643,296, filed on Aug. 18, 2003, now abandoned, and a continuation of application No. 10/794,161, filed on Mar. 4, 2004, now Pat. No. 7,098,800, application No. 12/807,146, which is a continuation of application No. 11/542,938, filed on Oct. 2, 2006, now abandoned, which is a continuation of application No. 10/984,643, filed on Nov. 8, 2004, now Pat. No. 8,061,245, which is a continuation of application No. 09/929,226, filed on Aug. 13, 2001, now Pat. No. 6,920,814, and a continuation of application No. 09/929,240, filed on Aug. 13, 2001, now Pat. No. 7,100,483, and a continuation of application No. 09/929,242, filed on Aug. 13, 2001, now Pat. No. 7,509,899, and a continuation of application No. 10/051,782, filed on Jan. 15, 2002, now Pat. No. 6,877,410, and a continuation of application No. 10/052,806, filed on Jan. 16, 2002, now Pat. No. 6,880,440, and a continuation of application No. 10/205,164, filed on Jul. 25, 2002, now Pat. No. 6,945,149, and a continuation of application No. 10/202,928, filed on Jul. 25, 2002, now Pat. No. 7,000,514, and a continuation of application No. 10/785,361, filed on Feb. 23, 2004, now Pat. No. 6,997,090, which is a continuation of application No. 10/215,929, filed on Aug. 9, 2002, now abandoned, said application No. 11/542,938 is a continuation of application No. 11/401,774, filed on Apr. 11, 2006, now Pat. No. 7,525,055, which is a continuation of application No. 11/027,322, filed on Dec. 31, 2004, now abandoned, which is a continuation of application No. 11/445,548, filed on Jun. 2, 2006, now Pat. No. 7,347,131, and a continuation of application No. 11/560,260, filed on Aug. 18, 2006, now Pat. No. 7,359,174, which is a continuation of application No. 10/923,282, filed on Aug. 20, 2004, now abandoned, application No. 12/807,146, which is a continuation of application No. 12/590,094, filed on Nov. 2, 2009, now Pat. No. 7,958,806, which is a continuation of application No. 09/929,236, filed on Aug. 13, 2001, now Pat. No. 7,610,836, application No. 12/807,146, which is a continuation of application No. 11/811,719, filed on Jun. 11, 2007, now Pat. No. 7,832,314, which is a continuation of application No. 11/061,162, filed on Feb. 18, 2005, now Pat. No. 7,228,772, which is a continuation of application No. 09/929,244, filed on Aug. 13, 2001, now Pat. No. 6,857,345, application No. 12/807,146, which is a continuation of application No. 12/587,695, filed on Oct. 9, 2009, now Pat. No. 7,921,754, which is a continuation of application No. 09/929,237, filed on Aug. 13, 2001, now Pat. No. 7,600,455, application No. 12/807,146, which is a continuation of application No. 12/661,766, filed on Mar. 22, 2010, now Pat. No. 8,051,759, which is a continuation of application No. 11/810,196, filed on Jun. 4, 2007, now Pat. No. 7,681,479, which is a continuation of application No. 09/929,234, filed on Aug. 13, 2001, now Pat. No. 7,225,712, application No. 12/807,146, which is a continuation of application No. 12/655,694, filed on Jan. 4, 2010, now Pat. No. 7,908,950, which is a continuation of application No. 12/079,836, filed on Mar. 27, 2008, now Pat. No. 7,640,837, which is a continuation of application No. 09/929,235, filed on Aug. 13, 2001, now Pat. No. 7,350,444, application No. 12/807,146, which is a continuation of application No. 12/799,211, filed on Apr. 19, 2010, now Pat. No. 8,100,039, which is a continuation of application No. 12/220,946, filed on Jul. 29, 2008, now Pat. No. 7,698,976, which is a continuation of application No. 09/929,238, filed on Aug. 13, 2001, now abandoned, application No. 12/807,146, which is a continuation of application No. 12/590,924, filed on Nov. 16, 2009, now Pat. No. 8,186,255, which is a continuation of application No. 12/154,675, filed on May 23, 2008, now Pat. No. 7,617,752, which is a continuation of application No. 10/053,390, filed on Jan. 16, 2002, now Pat. No. 7,377,199, which is a continuation-in-part of application No. 09/676,190, filed on Sep. 29, 2000, now Pat. No. 7,055,417, application No. 12/807,146, which is a continuation of application No. 12/313,162, filed on Nov. 17, 2008, now Pat. No. 7,789,002, which is a continuation of application No. 11/542,938, which is a continuation of application No. 11/348,580, filed on Feb. 6, 2006, now abandoned, which is a continuation of application No. 10/052,705, filed on Jan. 16, 2002, now Pat. No. 6,994,004, said application No. 12/313,162 is a continuation of application No. 11/098,984, filed on Apr. 4, 2005, now Pat. No. 7,353,737, which is a continuation of application No. 09/929,238, and a continuation of application No. 10/047,066, filed on Jan. 14, 2002, now Pat. No. 6,945,148, and a continuation of application No. 10/051,782, filed on Jan. 15, 2002, now Pat. No. 6,877,410, application No. 12/807,146, which is a continuation of application No. 12/661,993, filed on Mar. 26, 2010, now Pat. No. 8,061,246, which is a continuation of application No. 11/982,972, filed on Nov. 5, 2007, now Pat. No. 7,685,912, which is a continuation of application No. 10/932,339, filed on Sep. 1, 2004, now Pat. No. 7,290,472, which is a continuation of application No. 10/047,066, said application No. 10/932,339 is a continuation of application No. 10/050,085, filed on Jan. 14, 2002, now abandoned, application No. 12/807,146, which is a continuation of application No. 10/100,211, filed on Mar. 13, 2002, and a continuation of application No. 11/256,757, filed on Oct. 24, 2005, now Pat. No. 8,065,943, which is a continuation of application No. 09/955,418, filed on Sep. 17, 2001, now Pat. No. 6,957,601, application No. 12/807,146, which is a continuation of application No. 10/146,527, filed on May 15, 2002, and a continuation of application No. 12/586,469, filed on Sep. 21, 2009, which is a continuation of application No. 11/702,330, filed on Feb. 5, 2007, now Pat. No. 7,591,210, which is a continuation of application No. 10/189,031, filed on Jul. 2, 2002, now Pat. No. 7,171,879, application No. 12/807,146, which is a continuation of application No. 11/208,214, filed on Aug. 9, 2005, now Pat. No. 7,784,507, which is a continuation of application No. 10/251,576, filed on Sep. 20, 2002, now abandoned, which is a continuation of application No. 10/197,975, filed on Jul. 18, 2002, now abandoned, said application No. 11/208,214 is a continuation of application No. 09/676,190, application No. 12/807,146, which is a continuation of application No. 12/231,080, filed on Aug. 29, 2008, now Pat. No. 7,900,541, which is a continuation of application No. 11/487,717, filed on Jul. 17, 2006, now Pat. No. 7,421,315, which is a continuation of application No. 10/292,607, filed on Nov. 12, 2002, now Pat. No. 7,077,039, application No. 12/807,146, which is a continuation of application No. 12/655,962, filed on Jan. 11, 2010, now abandoned, which is a continuation of application No. 12/313,277, filed on Nov. 17, 2008, now Pat. No. 7,644,645, which is a continuation of application No. 10/345,630, filed on Jan. 15, 2003, now abandoned, application No. 12/807,146, which is a continuation of application No. 12/658,759, filed on Feb. 12, 2010, now abandoned, which is a continuation of application No. 11/787,471, filed on Apr. 17, 2007, now Pat. No. 7,661,343, which is a continuation of application No. 10/341,260, filed on Jan. 13, 2003, now abandoned, application No. 12/807,146, which is a continuation of application No. 11/647,676, filed on Dec. 29, 2006, now Pat. No. 7,836,804, which is a continuation of application No. 10/923,290, filed on Aug. 20, 2004, now Pat. No. 7,472,634, application No. 12/807,146, which is a continuation of application No. 12/079,820, filed on Mar. 27, 2008, now Pat. No. 7,845,258, which is a continuation of application No. 10/923,273, filed on Aug. 20, 2004, now Pat. No. 7,350,445, application No. 12/807,146, which is a continuation of application No. 12/454,569, filed on May 18, 2009, now Pat. No. 7,991,503, which is a continuation of application No. 11/027,600, filed on Dec. 31, 2004, now Pat. No. 7,536,238, application No. 12/807,146, which is a continuation of application No. 12/799,915, filed on May 3, 2010, now Pat. No. 8,087,438, which is a continuation of application No. 12/322,069, filed on Jan. 26, 2009, now Pat. No. 7,707,918, which is a continuation of application No. 11/107,499, filed on Apr. 15, 2005, now Pat. No. 7,481,140, application No. 12/807,146, which is a continuation of application No. 12/077,576, which is a continuation of application No. 11/027,254, filed on Dec. 31, 2004, now abandoned, application No. 12/807,146, which is a continuation of application No. 12/799,920, filed on May 3, 2010, now Pat. No. 8,122,807, which is a continuation of application No. 11/026,114, filed on Dec. 31, 2004, now Pat. No. 7,707,920, application No. 12/807,146, which is a continuation of application No. 11/026,006, filed on Dec. 31, 2004, and a continuation of application No. 11/045,972, filed on Jan. 28, 2005, now Pat. No. 7,827,890, and a continuation of application No. 12/454,730, filed on May 20, 2009, now Pat. No. 7,997,176, which is a continuation of application No. 11/395,502, filed on Mar. 31, 2006, now abandoned.

(60) Provisional application No. 60/225,200, filed on Aug. 14, 2000, provisional application No. 60/225,211, filed on Aug. 14, 2000, provisional application No. 60/225,170, filed on Aug. 14, 2000, provisional application No. 60/225,056, filed on Aug. 14, 2000, provisional application No. 60/225,169, filed on Aug. 14, 2000, provisional application No. 60/225,210, filed on Aug. 14, 2000, provisional application No. 60/298,207, filed on Jun. 13, 2001, provisional application No. 60/302,916, filed on Jul. 3, 2001, provisional application No. 60/324,729, filed on Sep. 24, 2001, provisional application No. 60/406,138, filed on Aug. 27, 2002, provisional application No. 60/452,159, filed on Mar. 5, 2003, provisional application No. 60/225,206, filed on Aug. 14, 2000, provisional application No. 60/225,089, filed on Aug. 14, 2000, provisional application No. 60/279,313, filed on Mar. 27, 2001, provisional application No. 60/270,942, filed on Feb. 22, 2001, provisional application No. 60/307,756, filed on Jul. 25, 2001, provisional application No. 60/308,492, filed on Jul. 27, 2001, provisional application No. 60/312,141, filed on Aug. 13, 2001, provisional application No. 60/533,598, filed on Dec. 31, 2003, provisional application No. 60/496,568, filed on Aug. 20, 2003, provisional application No. 60/225,201, filed on Aug. 14, 2000, provisional application No. 60/225,212, filed on Aug. 14, 2000, provisional application No. 60/225,059, filed on Aug. 14, 2000, provisional application No. 60/225,094, filed on Aug. 14, 2000, provisional application No. 60/225,058, filed on Aug. 14, 2000, provisional application No. 60/225,057, filed on Aug. 14, 2000, provisional application No. 60/182,866, filed on Feb. 16, 2000, provisional application No. 60/157,340, filed on Oct. 1, 1999, provisional application No. 60/270,011, filed on Feb. 20, 2001, provisional application No. 60/270,941, filed on Feb. 22, 2001, provisional application No. 60/270,942, filed on Feb. 22, 2001, provisional application No. 60/273,177, filed on Mar. 2, 2001, provisional application No. 60/273,178, filed on Mar. 2, 2001, provisional application No. 60/667,485, filed on Mar. 31, 2005, provisional application No. 60/273,902, filed on Mar. 6, 2001, provisional application No. 60/275,583, filed on Mar. 13, 2001, provisional application No. 60/233,459, filed on Sep. 18, 2000, provisional application No. 60/275,594, filed on Mar. 13, 2001, provisional application No. 60/275,595, filed on Mar. 13, 2001, provisional application No. 60/292,081, filed on May 17, 2001, provisional application No. 60/292,100, filed on May 17, 2001, provisional application No. 60/302,937, filed on Jul. 2, 2001, provisional application No. 60/302,916, filed on Jul. 3, 2001, provisional application No. 60/306,202, filed on Jul. 18, 2001, provisional application No. 60/307,657, filed on Jul. 25, 2001, provisional application No. 60/323,975, filed on Sep. 21, 2001, provisional application No. 60/182,866, filed on Feb. 16, 2000, provisional application No. 60/335,970, filed on Nov. 13, 2001, provisional application No. 60/349,989, filed on Jan. 16, 2002, provisional application No. 60/351,797, filed on Jan. 25, 2002, provisional application No. 60/496,550, filed on Aug. 20, 2003, provisional application No. 60/496,574, filed on Aug. 20, 2003, provisional application No. 60/533,791, filed on Dec. 31, 2003, provisional application No. 60/533,852, filed on Dec. 31, 2003, provisional application No. 60/533,811, filed on Dec. 31, 2003, provisional application No. 60/533,575, filed on Dec. 31, 2003, provisional application No. 60/540,377, filed on Jan. 29, 2004, provisional application No. 60/667,485, filed on Mar. 31, 2005.

(56) References Cited

U.S. PATENT DOCUMENTS

| | | |
|---|---|---|
| 1,811,066 A | 6/1931 | Tannewitz |
| 2,121,069 A | 6/1938 | Collins |
| 2,501,134 A | 3/1950 | Meckoski et al. |
| 2,758,615 A | 8/1956 | Mastriforte |
| 2,984,268 A | 5/1961 | Vuichard |
| 3,368,596 A | 2/1968 | Comer |
| 3,547,232 A * | 12/1970 | Fergie ............... 188/110 |
| 3,785,230 A | 1/1974 | Lokey |
| 3,858,095 A * | 12/1974 | Friemann et al. ...... 192/129 A |
| 3,953,770 A * | 4/1976 | Hayashi ................ 192/130 |
| 3,994,192 A | 11/1976 | Faig |
| 4,048,886 A * | 9/1977 | Zettler ................ 83/58 |
| 4,106,378 A | 8/1978 | Kaiser |
| 4,117,752 A * | 10/1978 | Yoneda ................ 83/62.1 |
| 4,453,112 A | 6/1984 | Sauer et al. |
| 4,528,488 A * | 7/1985 | Susemihl ............ 83/DIG. 1 |
| 5,081,406 A * | 1/1992 | Hughes et al. ........... 318/478 |
| 5,086,890 A | 2/1992 | Turczyn et al. |
| 5,148,053 A * | 9/1992 | Dubois, III ........... 83/DIG. 1 |
| 5,942,975 A * | 8/1999 | Sorensen .............. 340/562 |
| 5,974,927 A | 11/1999 | Tsune |
| 6,366,099 B1 * | 4/2002 | Reddi ................. 324/678 |
| 6,430,007 B1 | 8/2002 | Jabbari |
| 6,889,585 B1 * | 5/2005 | Harris et al. ........... 83/62 |
| 6,922,153 B2 * | 7/2005 | Pierga et al. ........... 340/686.5 |
| 6,944,004 B2 | 9/2005 | Ennis et al. |
| 6,994,004 B2 | 2/2006 | Gass et al. |
| 7,098,800 B2 * | 8/2006 | Gass ................ 83/58 |
| 7,350,444 B2 | 4/2008 | Gass et al. |
| 7,373,863 B2 * | 5/2008 | O'Banion et al. ........ 83/63 |
| 7,509,899 B2 * | 3/2009 | Gass et al. ............ 83/62.1 |
| 7,640,837 B2 * | 1/2010 | Gass et al. ............ 83/58 |
| 7,644,645 B2 * | 1/2010 | Gass et al. ............ 83/62.1 |
| 7,681,479 B2 * | 3/2010 | Gass et al. ............ 83/62.1 |
| 7,789,002 B2 * | 9/2010 | Gass et al. ............ 83/62.1 |
| 7,827,889 B2 * | 11/2010 | Carrier ................ 83/63 |
| 7,866,239 B2 * | 1/2011 | Gass et al. ............ 83/473 |
| 7,908,950 B2 * | 3/2011 | Gass et al. ............ 83/58 |
| 8,051,759 B2 * | 11/2011 | Gass et al. ............ 83/62.1 |
| 8,186,256 B2 * | 5/2012 | Carrier ................ 83/63 |
| 8,191,450 B2 * | 6/2012 | Gass ................ 83/62.1 |
| 8,196,499 B2 * | 6/2012 | Gass ................ 83/62.1 |
| 2002/0059853 A1 * | 5/2002 | Gass et al. ............ 83/62 |
| 2002/0059855 A1 * | 5/2002 | Gass et al. ............ 83/62 |
| 2007/0101842 A1 * | 5/2007 | Gass ................ 83/58 |
| 2007/0151433 A1 * | 7/2007 | Gass et al. ............ 83/477.2 |
| 2009/0084240 A1 * | 4/2009 | Gass et al. ............ 83/478 |
| 2010/0050843 A1 * | 3/2010 | Gass et al. ............ 83/477.1 |
| 2011/0079124 A1 * | 4/2011 | Carrier ................ 83/63 |

FOREIGN PATENT DOCUMENTS

| | | |
|---|---|---|
| DE | 76186 | 8/1921 |
| DE | 2800403 | 7/1979 |
| DE | 3427733 | 1/1986 |
| DE | 4235161 | 5/1993 |
| DE | 4326313 | 2/1995 |
| DE | 19609771 | 6/1998 |
| EP | 146460 | 11/1988 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |
| GB | 2142571 | 1/1985 |
| WO | WO 01/26064 A2 * | 4/2001 |

OTHER PUBLICATIONS

U.S. Appl. No. 60/157,340, filed Oct. 1, 1999, entitled "Fast-Acting Safety Stop."
U.S. Appl. No. 60/182,866, filed Feb. 16, 2000, entitled "Fast-Acting Safety Stop."
IWF 2000 Challengers Award Official Entry Form, submitted Apr. 26, 2000, 6 pages plus CD (the portions of U.S. patent applications referenced in the form are from U.S. Appl. No. 60/157,340, filed Oct. 1, 1999 and U.S. Appl. No. 60/182,866, filed Feb. 16, 2000).
Bosch Model 4000 Worksite Table Saw Operating/Safety Instructions, S-B Power Tool Company, Jul. 2000.
Bosch 10" Table Saw Model 0601476139 Parts List and Technical Bulletin, S-B Power Tool Company, Apr. 2001.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Co., Sep. 2001.
*You Should Have Invented It*, French television show DVD, date unknown.

* cited by examiner

TABLE SAW WITH IMPROVED SAFETY SYSTEM

CROSS-REFERENCE TO RELATED APPLICATIONS

This application is a continuation of the following U.S. Patent Applications, all of which are hereby incorporated by reference in their entireties:

Ser. No. 11/796,819, filed Apr. 30, 2007, issuing as U.S. Pat. No. 8,079,292 on Dec. 20, 2011, which is a continuation of Ser. No. 09/929,426, filed Aug. 13, 2001, issuing as U.S. Pat. No. 7,210,383 on May 1, 2007, which claims the benefit of and priority from a number of U.S. Provisional Patent Applications including Ser. No. 60/225,200, filed Aug. 14, 2000;

Ser. No. 12/655,695, filed Jan. 4, 2010, issuing as U.S. Pat. No. 8,006,595 on Aug. 30, 2011 which is a continuation of Ser. No. 11/975,985, filed Oct. 22, 2007, issuing as U.S. Pat. No. 7,640,835 on Jan. 5, 2010, which is a continuation of Ser. No. 09/929,221, filed Aug. 13, 2001, issuing as U.S. Pat. No. 7,284,467 on Oct. 23, 2007, which claims the benefit of and priority from a number of U.S. Provisional Patent Applications including Ser. No. 60/225,211, filed Aug. 14, 2000;

Ser. No. 12/002,388 filed Dec. 17, 2007, issuing as U.S. Pat. No. 8,011,279 on Sep. 6, 2011, which is a continuation of Ser. No. 09/929,227, filed Aug. 13, 2001, issuing as U.S. Pat. No. 7,308,843 on Dec. 18, 2007, which claims the benefit of and priority from a number of U.S. Provisional Patent Applications including Ser. No. 60/225,170, filed Aug. 14, 2000;

Ser. No. 11/401,050, filed Apr. 10, 2006, issuing as U.S. Pat. No. 7,788,999 on Sep. 7, 2010, which is a continuation of a number of applications including Ser. No. 09/929,240, filed Aug. 13, 2001, issuing as U.S. Pat. No. 7,100,483 on Sep. 5, 2006, which in turn claims the benefit of and priority from U.S. Provisional Patent Application Ser. No. 60/225,056, filed Aug. 14, 2000; Ser. No. 09/929,241, filed Aug. 13, 2001, issuing as U.S. Pat. No. 7,024,975 on Apr. 11, 2006, which in turn claims the benefit of and priority from a number of U.S. Provisional Patent Applications including Ser. No. 60/225,169, filed Aug. 14, 2000; Ser. No. 09/929,425, filed Aug. 13, 2001, issuing as U.S. Pat. No. 7,137,326 on Nov. 21, 2006, which in turn claims the benefit of and priority from U.S. Provisional Patent Application Ser. No. 60/225,210, filed Aug. 14, 2000; Ser. No. 10/172,553, filed Jun. 13, 2002, issuing as U.S. Pat. No. 7,231,856 on. Jun. 19, 2007, which in turn claims the benefit of and priority from U.S. Provisional Patent Application Ser. No. 60/298,207, filed. Jun. 13, 2001; Ser. No. 10/189,027, filed Jul. 2, 2002, issuing as U.S. Pat. No. 7,712,403 on May 11, 2010, which in turn claims the benefit of and priority from U.S. Provisional Patent Application Ser. No. 60/302,916, filed Jul. 3, 2001; Ser. No. 10/243,042, filed Sep. 13, 2002, issuing as U.S. Pat. No. 7,191,969 on Apr. 3, 2007, which in turn claims the benefit of and priority from U.S. Provisional Patent Application Ser. No. 60/324,729, filed Sep. 24, 2001; Ser. No. 10/643,296, filed Aug. 18, 2003, now abandoned, which in turn claims the benefit of and priority from U.S. Provisional Patent Application Ser. No. 60/406,138, filed Aug. 27, 2002; and Ser. No. 10/794,161, filed Mar. 4, 2004, issuing as U.S. Pat. No. 7,098,800 on Aug. 29, 2006, which in turn claims the benefit of and priority from U.S. Provisional Patent Application Ser. No. 60/452,159, filed Mar. 5, 2003;

Ser. No. 11/542,938, filed Oct. 2, 2006, now abandoned, which is a continuation of a number of applications, including Ser. No. 10/984,643, filed Nov. 8, 2004, issuing as U.S. Pat. No. 8,061,245 on Nov. 22, 2011, which in turn is a continuation of a number of applications, including Ser. No. 09/929,226, filed Aug. 13, 2001, issuing as U.S. Pat. No. 6,920,814 on Jul. 26, 2005, which in turn claims the benefit of and priority from U.S. Provisional Patent Application Ser. No. 60/225,206, filed Aug. 14, 2000; Ser. No. 09/929,240, filed Aug. 13, 2001, issuing as U.S. Pat. No. 7,100,483 on Sep. 5, 2006, which in turn claims the benefit of and priority from U.S. Provisional Patent Application Ser. No. 60/225,056, filed Aug. 14, 2000; Ser. No. 09/929,242, filed Aug. 13, 2001, issuing as U.S. Pat. No. 7,509,899 on Mar. 31, 2009, which claims the benefit of and priority from a number of U.S. Provisional Patent Applications including Ser. No. 60/225,089, filed Aug. 14, 2000; Ser. No. 10/051,782, filed Jan. 15, 2002, issuing as U.S. Pat. No. 6,877,410 on Apr. 12, 2005, which in turn claims the benefit of and priority from U.S. Provisional Patent Application Ser. No. 60/279,313, filed Mar. 27, 2001; Ser. No. 10/052,806, filed Jan. 16, 2002, issuing as U.S. Pat. No. 6,880,440 on Apr. 19, 2005, which in turn claims the benefit of and priority from U.S. Provisional Patent Application Ser. No. 60/270,942, filed Feb. 22, 2001; Ser. No. 10/205,164, filed Jul. 25, 2002, issuing as U.S. Pat. No. 6,945,149 on Sep. 20, 2005, which in turn claims the benefit of and priority from U.S. Provisional Patent Application Ser. No. 60/307,756, filed Jul. 25, 2001; Ser. No. 10/202,928, filed Jul. 25, 2002, issuing as U.S. Pat. No. 7,000,514 on Feb. 21, 2006, which in turn claims the benefit of and priority from U.S. Provisional Patent Application Ser. No. 60/308,492, filed Jul. 27, 2001; and Ser. No. 10/785,361, filed Feb. 23, 2004, issuing as U.S. Pat. No. 6,997,090 on Feb. 14, 2006, which is a continuation of Ser. No. 10/215,929, filed Aug. 9, 2002, now abandoned, which in turn claims the benefit of and priority from U.S. Provisional Patent Application Ser. No. 60/312,141, filed Aug. 13, 2001;

Ser. No. 11/542,938 is also a continuation of Ser. No. 11/401,774, filed Apr. 11, 2006, issuing as U.S. Pat. No. 7,525,055 on Apr. 28, 2009, which is a continuation of Ser. No. 11/027,322, filed. Dec. 31, 2004, now abandoned, which claims the benefit of and priority from U.S. Provisional Patent Application Ser. No. 60/533,598, filed Dec. 31, 2003; Ser. No. 11/445,548, filed Jun. 2, 2006, issuing as U.S. Pat. No. 7,347,131 on Mar. 25, 2008; and Ser. No. 11/506,260, filed Aug. 18, 2006, issuing as U.S. Pat. No. 7,359,174 on Apr. 15, 2008, which is a continuation of a number of application including Ser. No. 10/923,282, filed Aug. 20, 2004, now abandoned, which in turn claims the benefit of and priority from U.S. Provisional Patent Application Ser. No. 60/496,568, filed. Aug. 20, 2003;

Ser. No. 12/590,094, filed Nov. 2, 2009, issuing as U.S. Pat. No. 7,958,806 on Jun. 14, 2011, which is a continuation of Ser. No. 09/929,236, filed Aug. 13, 2001, issuing as U.S. Pat. No. 7,610,836 on Nov. 3, 2009, which claims the benefit of and priority from a number of U.S. Provisional Patent Applications including Ser. No. 60/225,201, filed Aug. 14, 2000;

Ser. No. 11/811,719, filed Jun. 11, 2007, issuing as U.S. Pat. No. 7,832,314 on Nov. 16, 2010, which is a continuation of Ser. No. 11/061,162, filed Feb. 18, 2005, issuing as U.S. Pat. No. 7,228,772 on Jun. 12, 2007, which is a continuation of Ser. No. 09/929,244, filed Aug. 13, 2001, issuing as U.S. Pat. No. 6,857,345 on Feb. 22, 2005, which in turn claimed the benefit of and priority from a number of U.S. Provisional Patent Applications including Ser. No. 60/225,212, filed Aug. 14, 2000;

Ser. No. 12/587,695, filed Oct. 9, 2009, issuing as U.S. Pat. No. 7,921,754 on Apr. 12, 2011, which is a continuation of Ser. No. 09/929,237, filed Aug. 13, 2001, issuing as U.S. Pat. No. 7,600,455 on Oct. 13, 2009, which claims the benefit of and priority from a number of U.S. Provisional Patent Applications including Ser. No. 60/225,059, filed Aug. 14, 2000;

Ser. No. 12/661,766, filed Mar. 22, 2010, issuing as U.S. Pat. No. 8,051,759 on Nov. 8, 2011, which is a continuation of Ser. No. 11/810,196, filed Jun. 4, 2007, issuing as U.S. Pat. No. 7,681,479 on Mar. 23, 2010, which is a continuation of Ser. No. 09/929,234, filed Aug. 13, 2001, issuing as U.S. Pat. No. 7,225,712 on Jun. 5, 2007, which claims the benefit of and priority from a number of U.S. Provisional Patent Applications including Ser. No. 60/225,094, filed Aug. 14, 2000;

Ser. No. 12/655,694, filed Jan. 4, 2010, issuing as U.S. Pat. No. 7,908,950 on Mar. 22, 2011, which is a continuation of Ser. No. 12/079,836, filed Mar. 27, 2008, issuing as U.S. Pat. No. 7,640,837 on Jan. 5, 2010, which is a continuation of Ser. No. 09/929,235, filed Aug. 13, 2001, issuing as U.S. Pat. No. 7,350,444 on Apr. 1, 2008, which claims the benefit of and priority from a number of U.S. Provisional Patent Applications including Ser. No. 60/225,058, filed Aug. 14, 2000;

Ser. No. 12/799,211, filed Apr. 19, 2010, issuing as U.S. Pat. No. 8,100,039 on Jan. 24, 2012, which is a continuation of Ser. No. 12/220,946, filed Jul. 29, 2008, issuing as U.S. Pat. No. 7,698,976 on Apr. 20, 2010, which is a continuation of Ser. No. 09/929,238, filed Aug. 13, 2001, now abandoned, which claims the benefit of and priority from a number of U.S. Provisional Patent Applications including Ser. No. 60/225,057, filed Aug. 14, 2000;

Ser. No. 12/590,924, filed Nov. 16, 2009 now U.S. Pat. No. 8,186,255, which is a continuation of Ser. No. 12/154,675, filed May 23, 2008, issuing as U.S. Pat. No. 7,617,752 on Nov. 17, 2009, which is a continuation of Ser. No. 10/053,390, filed Jan. 16, 2002, issuing as U.S. Pat. No. 7,377,199 on May 27, 2008, which is a continuation-in-part of a number of applications including Ser. No. 09/676,190, filed Sep. 29, 2000, issuing as U.S. Pat. No. 7,055,417 on Jun. 6, 2006, which in turn claimed the benefit of and priority from the following U.S. Provisional Patent Applications: Ser. No. 60/182,866, filed Feb. 16, 2000, and Ser. No. 60/157,340, filed Oct. 1, 1999; and Ser. No. 10/053,390 also claims the benefit of and priority from U.S. Provisional Patent Application Ser. No. 60/270,011, filed. Feb. 20, 2001;

Ser. No. 12/313,162, filed Nov. 17, 2008, issuing as U.S. Pat. No. 7,789,002 on Sep. 7, 2010, which is a continuation of Ser. No. 11/542,938, filed Oct. 2, 2006, now abandoned, which is a continuation of a number of patent applications, including Ser. No. 11/348,580, fled Feb. 6, 2006, now abandoned, which is a continuation of a number of applications including Ser. No. 10/052,705, filed Jan. 16, 2002, issuing as U.S. Pat. No. 6,994,004 on Feb. 7, 2006, which in turn claimed the benefit of and priority from the following U.S. Provisional Patent Applications: Ser. No. 60/270,011, filed Feb. 20, 2001, Ser. No. 60/270,941, filed Feb. 22, 2001, Ser. No. 60/270,942, filed Feb. 22, 2001, Ser. No. 60/273,177, filed Mar. 2, 2001, and Ser. No. 60/273,178, filed Mar. 2, 2001; and Ser. No. 11/348,580 also claims the benefit of and priority from U.S. Provisional Patent Application Ser. No. 60/667,485, filed Mar. 31, 2005; and Ser. No. 12/313,162 is also a continuation of Ser. No. 11/098,984, filed Apr. 4, 2005, issuing as U.S. Pat. No. 7,353,737 on Apr. 8, 2008, which, is a continuation of a Ser. No. 09/929,238, filed Aug. 13, 2001, now abandoned, Ser. No. 10/047,066, filed Jan. 14, 2002, issuing as U.S. Pat. No. 6,945,148 on Sep. 20, 2005, and Ser. No. 10/051,782, filed Jan. 15, 2002, issuing as U.S. Pat. No. 6,877,410 on Apr. 12, 2005;

Ser. No. 12/661,993, filed Mar. 26, 2010, issuing as U.S. Pat. No. 8,061,246 on Nov. 22, 2011, which is a continuation of Ser. No. 11/982,972, filed Nov. 5, 2007, issuing as U.S. Pat. No. 7,685,912 on Mar. 30, 2010, which is a continuation of Ser. No. 10/932,339, filed Sep. 1, 2004, issuing as U.S. Pat. No. 7,290,472 on Nov. 6, 2007, which is a continuation of Ser. No. 10/047,066, filed Jan. 14, 2002, issuing as U.S. Pat. No. 6,945,148 on Sep. 20, 2005, which in turn claimed the benefit of and priority from the following U.S. Provisional Patent Applications: Ser. No. 60/270,011, filed Feb. 20, 2001, Ser. No. 60/270,941, filed Feb. 22, 2001, Ser. No. 60/270,942, filed Feb. 22, 2001, Ser. No. 60/273,177, filed Mar. 2, 2001, Ser. No. 60/273,178, filed Mar. 2, 2001, and Ser. No. 60/273,902, filed Mar. 6, 2001; and Ser. No. 10/932,339 is also a continuation of Ser. No. 10/050,085, filed Jan. 14, 2002, now abandoned;

Ser. No. 10/100,211, filed Mar. 13, 2002, which claims the benefit of and priority from U.S. Provisional Patent Application Ser. No. 60/275,583, filed Mar. 13, 2001;

Ser. No. 11/256,757, filed Oct. 24, 2005, issuing as U.S. Pat. No. 8,065,943 on Nov. 29, 2011, which is a continuation of Ser. No. 09/955,418, filed Sep. 17, 2001, issuing as U.S. Pat. No. 6,957,601 on Oct. 25, 2005, which in turn claimed the benefit of and priority to a number of U.S. Provisional Patent Applications, including: Ser. No. 60/233,459, filed Sep. 18, 2000, Ser. No. 60/270,011, filed Feb. 20, 2001, Ser. No. 60/270,941, filed Feb. 22, 2001, Ser. No. 60/270,942, filed Feb. 22, 2001, Ser. No. 60/273,177, filed Mar. 2, 2001, Ser. No. 60/273,178, filed Mar. 2, 2001, Ser. No. 60/273,902, filed Mar. 6, 2001, Ser. No. 60/275,594, filed Mar. 13, 2001, Ser. No. 60/275,595, filed Mar. 13, 2001, Ser. No. 60/279,313, filed Mar. 27, 2001, Ser. No. 60/292,081, filed May 17, 2001, Ser. No. 60/292,100, filed May 17, 2001, Ser. No. 60/298,207, filed Jun. 13, 2001, Ser. No. 60/302,937, filed Jul. 2, 2001, Ser. No. 60/302,916, filed Jul. 3, 2001, Ser. No. 60/306,202, filed Jul. 18, 2001, Ser. No. 60/307,657, filed Jul. 25, 2001, Ser. No. 60/308,492, filed Jul. 27, 2001, and Ser. No. 60/312,141, filed Aug. 13, 2001;

Ser. No. 10/146,527, filed May 15, 2002, which claims the benefit of and priority from U.S. Provisional Patent Application Ser. No. 60/292,100, filed May 17, 2001;

Ser. No. 12/586,469, filed Sep. 21, 2009, which is a continuation of Ser. No. 11/702,330, filed Feb. 5, 2007, issuing as U.S. Pat. No. 7,591,210 on Sep. 22, 2009, which is a continuation of Ser. No. 10/189,031, filed Jul. 2, 2002, issuing as U.S. Pat. No. 7,171,879 on Feb. 6, 2007, which claims the benefit of and priority from U.S. Provisional Patent Application Ser. No. 60/302,937, filed Jul. 2, 2001;

Ser. No. 11/208,214, filed Aug. 19, 2005, issuing as U.S. Pat. No. 7,784,507 on Aug. 31, 2010, which is a continuation of Ser. No. 10/251,576, filed Sep. 20, 2002, now abandoned, which is a continuation of Ser. No. 10/197,975, filed Jul. 18, 2002, now abandoned, and which claimed the benefit of and priority to U.S. Provisional Patent Application Ser. No. 60/323,975, filed Sep. 21, 2001, and Ser. No. 11/208,214 is also a continuation of Ser. No. 09/676,190, filed Sep. 29, 2000, issuing as U.S. Pat. No. 7,055,417 on Jun. 6, 2006, which in turn claimed the benefit of and priority from U.S. Provisional Patent Application Ser. No. 60/157,340, filed Oct. 1, 1999 and Ser. No. 60/182,866, filed Feb. 16, 2000;

Ser. No. 12/231,080, filed Aug. 29, 2008, issuing as U.S. Pat. No. 7,900,541 on Mar. 8, 2011, which is a continuation of Ser. No. 11/487,717, filed Jul. 17, 2006, issuing as U.S. Pat. No. 7,421,315, on Sep. 2, 2008, which is a continuation of U.S. patent application Ser. No. 10/292,607, filed Nov. 12, 2002, issued issuing as U.S. Pat. No. 7,077,039 on Jul. 18, 2006, which claims the benefit of and priority from U.S. Provisional Patent Application Ser. No. 60/335,970, filed Nov. 13, 2001;

Ser. No. 12/655,962, filed Jan. 11, 2010, now abandoned, which is a continuation of Ser. No. 12/313,277, filed Nov. 17, 2008, issuing as U.S. Pat. No. 7,644,645 on Jan. 12, 2010, which is a continuation of Ser. No. 10/345,630, filed Jan. 15, 2003, now abandoned, which claims the benefit of and priority from U.S. Provisional Patent Application. Ser. No. 60/349,989, filed Jan. 16, 2002;

Ser. No. 12/658,759, filed Feb. 12, 2010, now abandoned, which is a continuation of Ser. No. 11/787,471, filed Apr. 17, 2007, issuing as U.S. Pat. No. 7,661,343 on Feb. 16, 2010, which is a continuation of Ser. No. 10/341,260, filed Jan. 13, 2003, now abandoned, which claims the benefit of and priority from U.S. Provisional Patent Application Ser. No. 60/351,797, filed Jan. 25, 2002;

Ser. No. 11/647,676, filed Dec. 29, 2006, issuing as U.S. Pat. No. 7,836,804 on Nov. 23, 2010, which is a continuation of Ser. No. 10/923,290, filed Aug. 20, 2004, issuing as U.S. Pat. No. 7,472,634 on Jan. 6, 2009, which claims the benefit of and priority from U.S. Provisional Patent Application Ser. No. 60/496,550, filed Aug. 20, 2003;

Ser. No. 12/079,820, filed Mar. 27, 2008, issuing as U.S. Pat. No. 7,845,258 on Dec. 7, 2010, which is a continuation of Ser. No. 10/923,273, filed Aug. 20, 2004, issuing as U.S. Pat. No. 7,350,445 on Apr. 1, 2008, which claims the benefit of and priority from U.S. Provisional Patent Application Ser. No. 60/496,574, filed Aug. 20, 2003;

Ser. No. 12/454,569, filed May 18, 2009, issuing as U.S. Pat. No. 7,991,503 on Aug. 2, 2011, which is a continuation of Ser. No. 11/027,600, filed Dec. 31, 2004, issuing as U.S. Pat. No. 7,536,238 on May 19, 2009, which claims the benefit of and priority from U.S. Provisional Patent Application Ser. No. 60/533,791, filed Dec. 31, 2003;

Ser. No. 12/799,915, filed May 3, 2010, issuing as U.S. Pat. No. 8,087,438 on Jan. 3, 2012, which is a continuation of Ser. No. 12/322,069, filed Jan. 26, 2009, issuing as U.S. Pat. No. 7,707,918 on May 4, 2010, which is a continuation of U.S. patent application Ser. No. 11/107,499, filed Apr. 15, 2005, issuing as U.S. Pat. No. 7,481,140 on Jan. 27, 2009;

Ser. No. 12/077,576, filed Mar. 19, 2008, now abandoned, which is a continuation of Ser. No. 11/027,254, filed Dec. 31, 2004, now abandoned, which claims the benefit of and priority from U.S. Provisional Patent Application Ser. No. 60/533,852, filed Dec. 31, 2003;

Ser. No. 12/799,920, filed May 3, 2010, issuing as U.S. Pat. No. 8,122,807 on Feb. 28, 2012, which is a continuation of Ser. No. 11/026,114, filed Dec. 31, 2004, issuing as U.S. Pat. No. 7,707,920 on May 4, 2010, which claims the benefit of and priority from U.S. Provisional Patent Application Ser. No. 60/533,811, filed Dec. 31, 2003;

Ser. No. 11/026,006, filed Dec. 31, 2004, which claims the benefit of and priority from U.S. Provisional Patent Application Ser. No. 60/533,575, filed Dec. 31, 2003;

Ser. No. 11/045,972, filed Jan. 28, 2005, issuing as U.S. Pat. No. 7,827,890 on Nov. 9, 2010, which claims the benefit of and priority from U.S. Provisional Patent Application Ser. No. 60/540,377, filed Jan. 29, 2004; and Ser. No. 12/454,730, filed May 20, 2009, issuing as U.S. Pat. No. 7,997,176 on Aug. 16, 2011, which is a continuation of Ser. No. 11/395,502, filed Mar. 31, 2006 now abandoned, which claims the benefit of and priority from U.S. Provisional Patent Application. Ser. No. 60/667,485, filed Mar. 31, 2005.

FIELD

The present invention relates to table saws and more particularly to a table saw with an improved safety system.

BACKGROUND

Table saws are a type of woodworking machinery used to cut workpieces of wood, plastic and other materials. Table saws include a flat surface or table with a circular saw blade extending up through a slot in the table. A user slides a workpiece on the table against and past the blade while the blade is spinning to cut the workpiece.

Of all the tools in a woodworking shop, table saws present perhaps the greatest risk of injury. Table saws present a risk of injury to users because the spinning blade is often exposed when in use. The blade cuts very quickly and can sever a finger upon the slightest slip or misplacement. Accordingly, safety features or systems have been developed to minimize the risk of injury. Probably the most common safety feature is a blade guard that physically blocks a user from making contact with the spinning blade. In many situations, blade guards effectively reduce the risk of injury; however, there are many instances where the nature of the operations to be performed precludes using a guard that completely blocks access to the blade.

There exists a need for a table saw with a safety system that significantly reduces the risk of serious injury to a user accidentally contacting the spinning blade. The present invention provides such a table saw.

DETAILED DESCRIPTION AND BEST MODE

Figure 1:
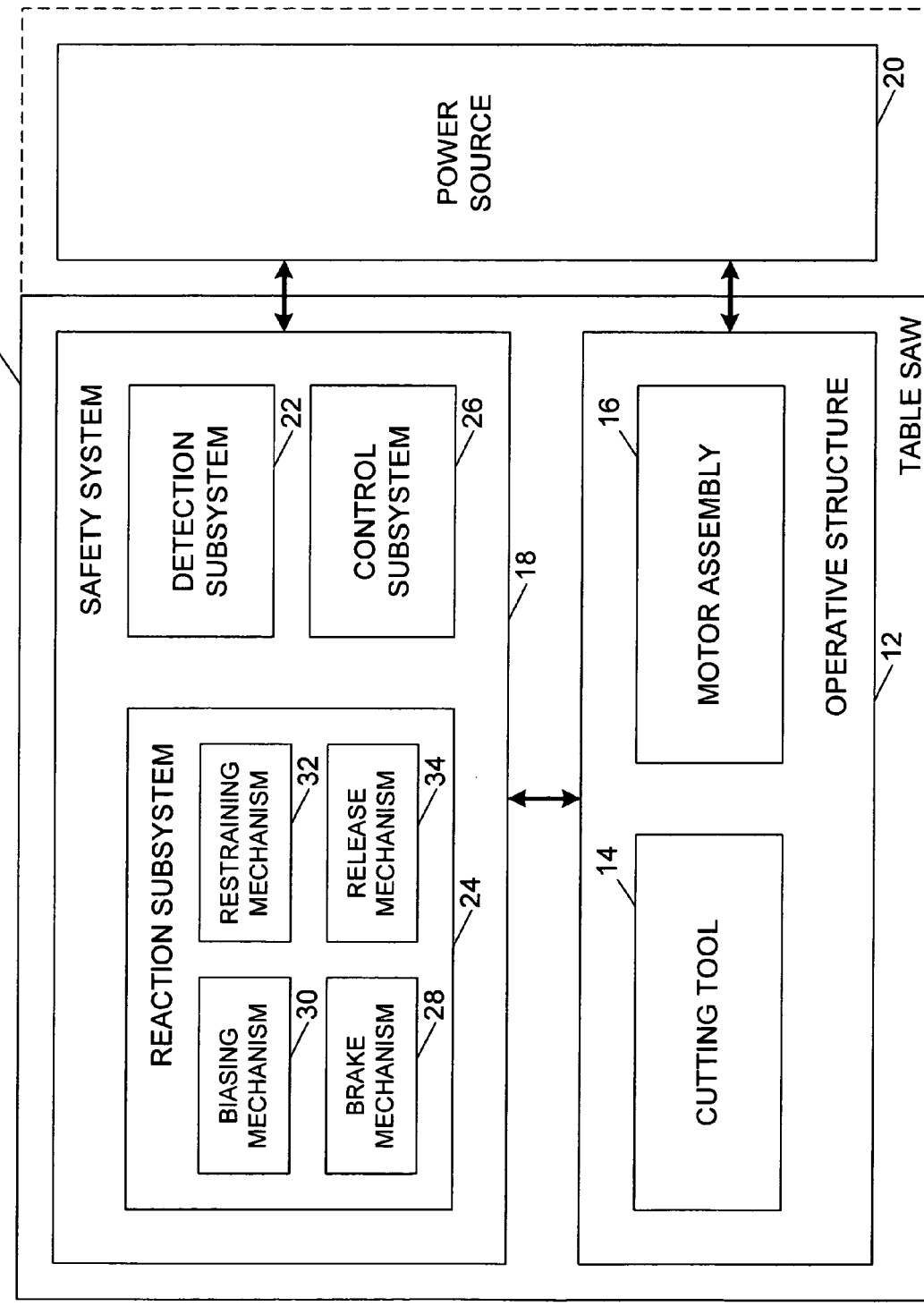
FIG. 1 is a schematic block diagram of a table saw with a fast-acting safety system.

A table saw according to the present invention is shown schematically in FIG. 1 and indicated generally at 10. Table saw 10 may be any of a variety of different types and configurations of table saw adapted for cutting workpieces, such as wood, plastic, etc. Table saw 10 includes an operative structure 12 having a cutting tool 14 and a motor assembly 16 adapted to drive the cutting tool. Table saw 10 also includes a safety system 18 configured to minimize the potential of a serious injury to a person using table saw 10. Safety system 18 is adapted to detect the occurrence of one or more dangerous, or triggering, conditions during use of table saw 10. If such a dangerous condition is detected, safety system 18 is adapted to engage operative structure 12 to limit any injury to the user caused by the dangerous condition.

Table saw 10 also includes a suitable power source 20 configured to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of table saw 10.

Motor assembly 16 includes one or more motors adapted to drive cutting tool 14. The motors may be either directly or indirectly coupled to the cutting tool. Cutting tool 14 typically includes one or more blades or other suitable cutting implements that are adapted to cut or remove portions from the workpieces. The particular form of cutting tool 14 will vary depending upon the various embodiments of table saw 10 and/or the workpieces being cut.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of table saw 10. In addition, control subsystem 26 typically includes one or more instruments operable by a user to control the table saw. The control subsystem is configured to control table saw 10 in response to the inputs it receives.

Detection subsystem 22 is configured to detect one or more dangerous, or triggering, conditions during use of table saw 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, filed Feb. 16, 2000 and U.S. patent application Ser. No. 09/676,190, filed Sep. 29, 2000, the disclosures of which are herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of table saw 10 and/or the dangerous condition that is detected. Further, the reaction subsystem may be configured to take a combination of steps to protect the user from serious injury. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. Placement of a barrier between the cutting tool and teeth is described in more detail in U.S. Provisional Patent Application Ser. No. 60/225,206, filed Aug. 14, 2000 and U.S. patent application Ser. No. 09/929,226, filed Aug. 13, 2001, the disclosures of which are herein incorporated by reference. Retraction of the cutting tool from its operating position is described in more detail in U.S. Provisional Patent Application Ser. No. 60/225,089, filed Aug. 14, 2000 and U.S. patent application Ser. No. 09/929,242, filed Aug. 13, 2001, the disclosures of which are herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of table saw 10, restraining mechanism 32 holds the brake mechanism out of engagement with the operative structure. However, upon receipt of an activation signal by control subsystem 26, the brake mechanism is released from the restraining mechanism by release mechanism 34, whereupon, the brake mechanism quickly engages at least a portion of the operative structure to bring the cutting tool to a stop.

Figure 2:
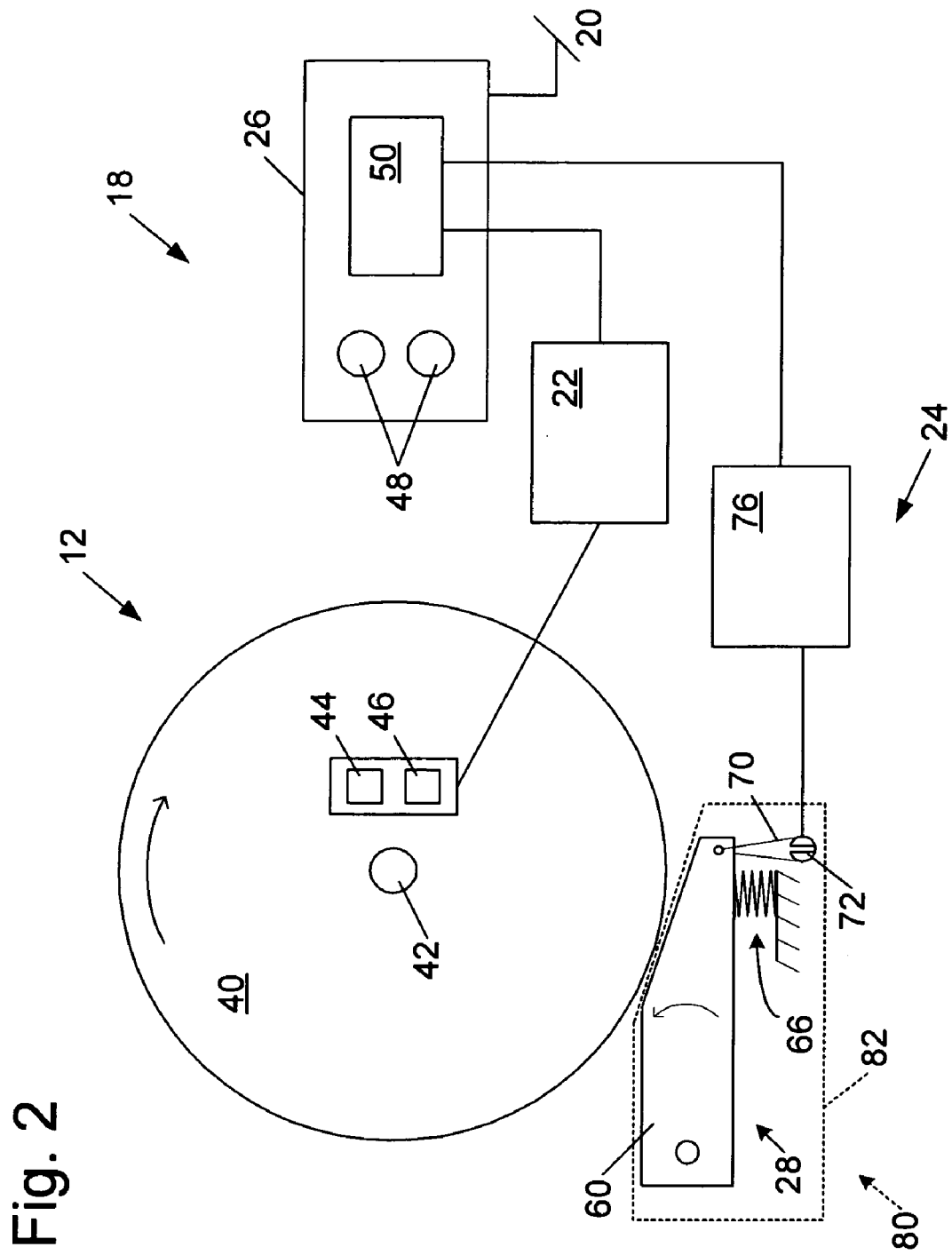
FIG. 2 is a schematic diagram of an exemplary safety system configured to stop the blade of a table saw.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of table saw 10 includes a cutting tool 14 in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade.

In the exemplary implementation, detection subsystem 22 is adapted to detect the dangerous condition of the user coming into contact with blade 40. The detection subsystem includes a sensor assembly having contact detection electrodes 44 and 46, capacitively coupled to blade 40 to detect any contact between the user's body and the blade. Typically, the blade, or some larger portion of cutting tool 14 is electrically isolated from the remainder of table saw 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, filed Aug. 14, 2000, U.S. patent application Ser. No. 09/929,426, filed Aug. 13, 2001, U.S. Provisional Patent Application Ser. No. 60/225,211, filed Aug. 14, 2000 and U.S. patent application Ser. No. 09/929,221, filed Aug. 13, 2001, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, filed Aug. 14, 2000, U.S. patent application Ser. No. 09/929,237, filed Aug. 13, 2001, U.S. Provisional Patent Application Ser. No. 60/225,094, filed Aug. 14, 2000 and U.S. patent application Ser. No. 09/929,234, filed Aug. 13, 2001, the disclosures of which are herein incorporated by reference.

In the exemplary implementation shown in FIG. 2, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultra-high molecular weight polyethylene (UHMW), Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the implementation shown in FIG. 2, pawl 60 is pivoted into the teeth of blade 40. It should be understood that sliding or rotary movement of pawl 60 may also be used. The spring is adapted to urge pawl 60 into the teeth of the blade with sufficient force to grip the blade and quickly bring it to a stop.

The pawl is held away from the edge of the blade by a restraining member in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, member 70 holds the pawl relatively close to the edge of the blade to reduce the distance pawl 60 must travel to engage blade 40. Positioning the pawl relatively close to the edge of the blade reduces the time required for the pawl to engage and stop the blade. Typically, the pawl is held approximately $\frac{1}{32}$-inch to $\frac{1}{4}$-inch from the edge of the blade by fusible member 70; however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, filed Aug. 14, 2000, U.S. patent application Ser. No. 09/929,240, filed Aug. 13, 2001, U.S. Provisional Patent Application Ser. No. 60/225,170, filed Aug. 14, 2000, U.S. patent application Ser. No. 09/929,227, filed Aug. 13, 2001, U.S. Provisional Patent Application Ser. No. 60/225,169, filed Aug. 14, 2000 and U.S. patent application Ser. No. 09/929,241, filed Aug. 13, 2001, the disclosures of which are herein incorporated by reference.

It will be appreciated that activation of the brake mechanism may require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, filed Aug. 14, 2000, U.S. patent application Ser. No. 09/929,236, filed Aug. 13, 2001, U.S. Provisional Patent Application Ser. No. 60/225,212, filed Aug. 14, 2000 and U.S. patent application Ser. No. 09/929,244, filed Aug. 13, 2001, the disclosures of which are herein incorporated by reference.

Figure 3:
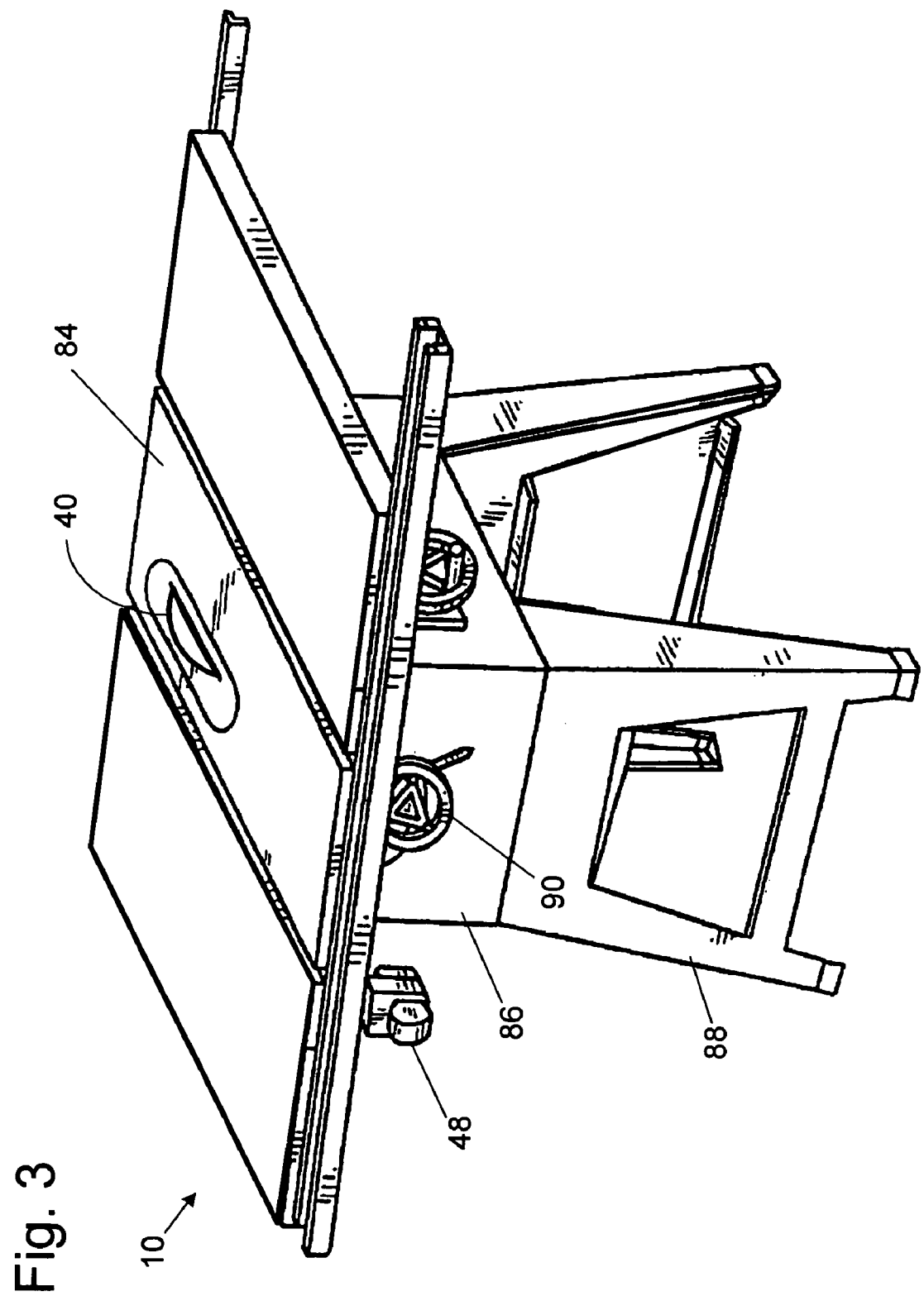
FIG. 3 shows an exemplary table saw.

Turning attention now to FIG. 3, one exemplary type of table saw, often called a contractor's saw, is shown in more detail. Table saw 10 includes a table 84 through which a blade 40 extends from beneath the table. The table and blade are supported by a housing 86 and legs 88. Housing 86 encloses the mechanics that support, position and drive the blade. A motor to drive the blade can be positioned in or outside the housing. A switch 48 turns the saw on and off, causing blade 40 to rotate. Handles, such as handle 90, are used to adjust the position of the blade relative to the table, for example, how far the blade extends above the table or how the blade tilts relative to the top of the table. Of course, table saws take many different configurations, from large saws sized for industrial use to small saws that can be placed on a bench top or counter, and table saws come with various types of tables and housings.

Figure 4:
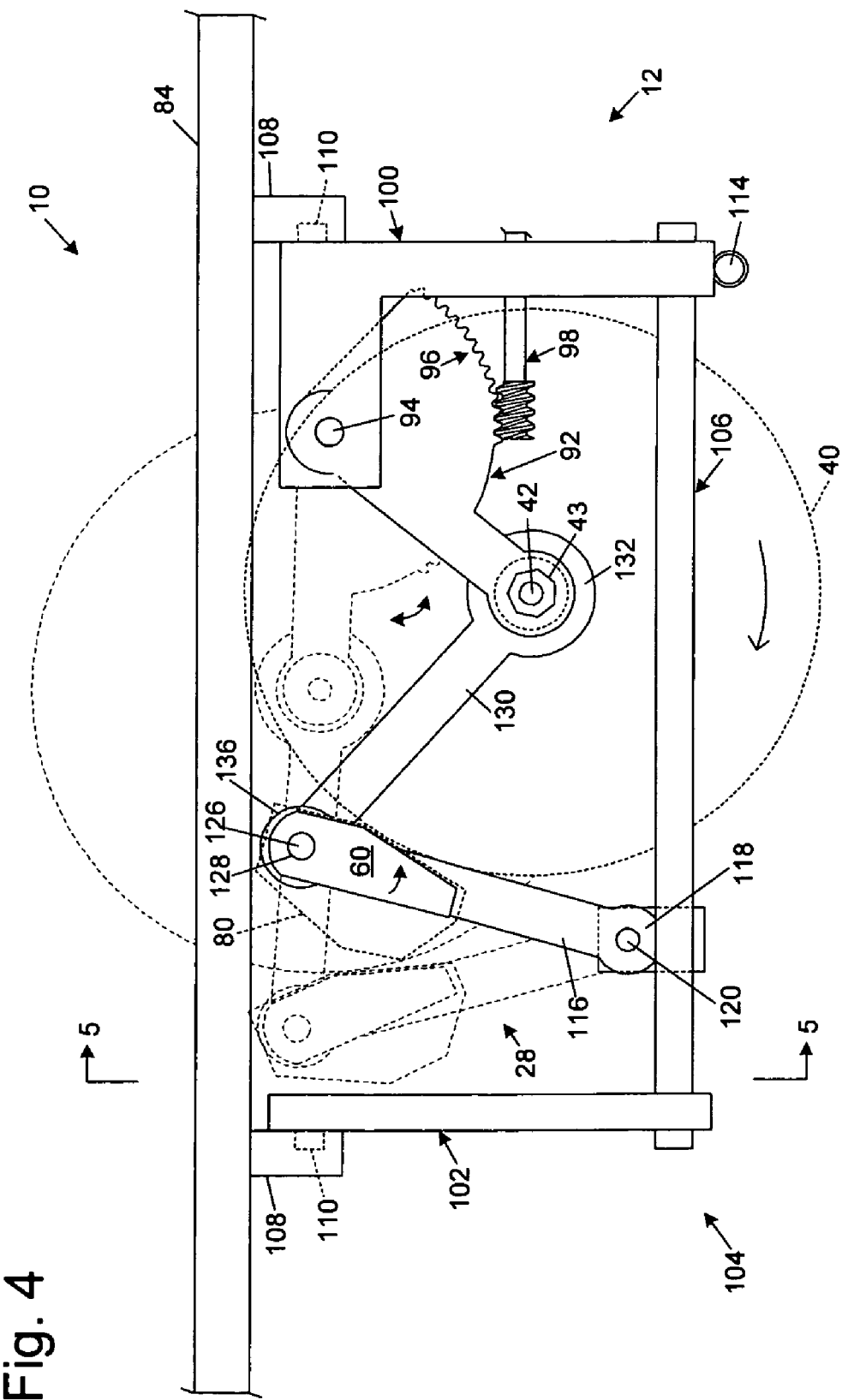
FIG. 4 is a fragmentary schematic side elevation of one exemplary brake mechanism configured to stop the rotation of the blade on a table saw.
Figure 5:
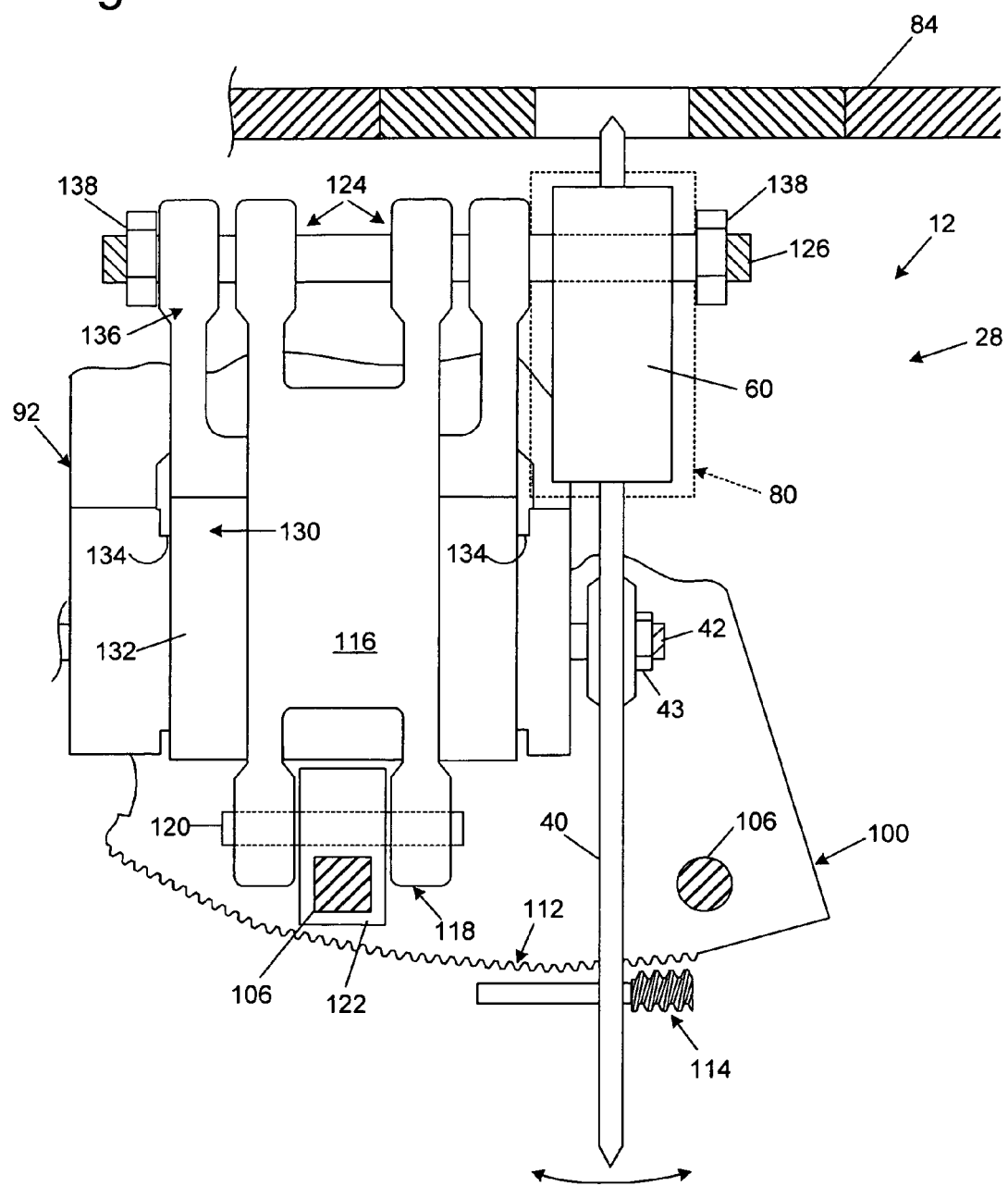
FIG. 5 is a fragmentary cross-sectional schematic view taken generally along line 5-5 in FIG. 4.
Figure 6:
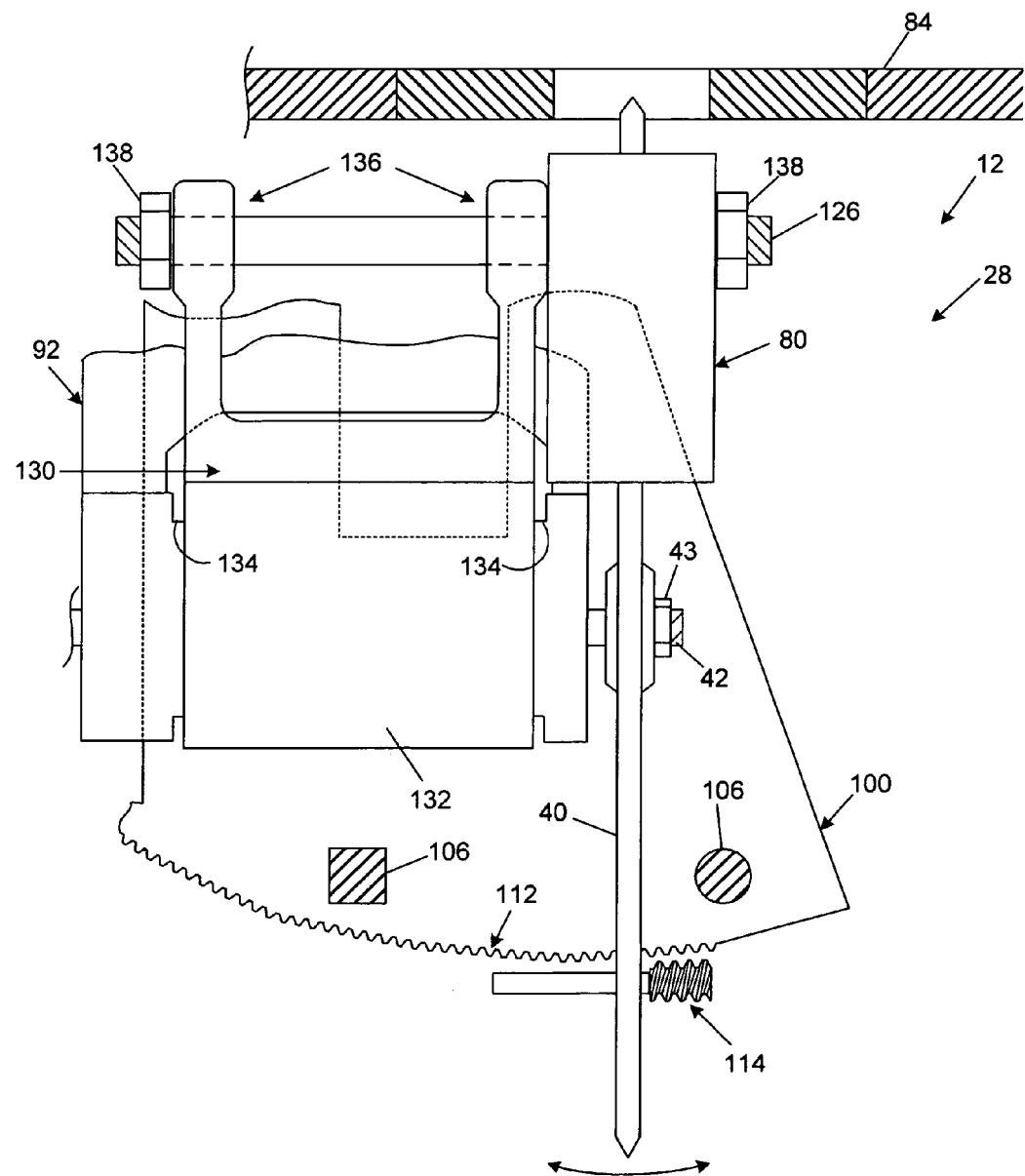
FIG. 6 is similar to FIG. 5 but the support brace has been removed to further illustrate other portions of the brake mechanism and table saw.

It will be appreciated that reaction subsystem 24 may be configured and mounted in a variety of different ways to stop the rotation of blade 40. Typically, the reaction subsystem is configured to stop the blade regardless of the position (i.e., height and tilt) of the blade. In some embodiments such as described in the references incorporated herein, the brake mechanism is shaped to engage the blade at any height and/or tilt angle. In alternative embodiments, the position of the brake mechanism is coupled to move along with the blade so that the blade is stationary relative to the brake mechanism. Examples of such embodiments are also described in the incorporated references. As a further alternative, brake mechanism 28 may be configured to move separately from the blade while maintaining a constant orientation adjacent the perimeter of the blade. One exemplary implementation of such an alternative embodiment is illustrated in FIGS. 4-6.

In the depicted embodiment, blade 40 is mounted on an arbor 42 by a nut 43. The arbor spins the blade in the direction indicated. Table 84 which defines the work surface for the table saw, is adjacent the blade and the blade is selectively extendable above the table as shown. An arbor block 92 supports arbor 42 and holds the arbor in bearings to allow the arbor to rotate. The arbor is connected to a motor (not shown), such as by a belt extending around a pulley on the arbor and a pulley on the motor's drive shaft, and the motor drives or spins the arbor, as is known in the art.

Arbor block 92 is mounted on a pin 94 and may pivot around that pin. Arbor block 92 is configured to pivot up and down so that a user can raise and lower the blade relative to the table as needed. A portion of arbor block 92 defines a gear segment 96. Table saw 10 includes a first worm gear control member 98, configured to engage and drive gear segment 96. First worm gear control member 98 is attached to a handle 90. A user adjusts the vertical position of blade 40 by turning the first worm gear control member via the handle. Alternatively, table saw 10 may be configured in other ways to adjust the height of the blade, such as are known to those of skill in the art.

Pin 94 is mounted to a first support member 100 that, along with a second support member 102, comprise at least part of a support frame 104. The support frame also includes one or more cross braces 106 extending between lower portions of the first and second support members to connect the support members together. The upper portions of the first and second support members are pivotally coupled to table 84. A pair of support brackets 108 extend downward from the lower surface of the table adjacent each of the first and second support members. Each support member includes a projection 110 adapted to fit within and ride along an arcuate track (not shown) defined in each corresponding bracket 108. The arcuate tracks define a pivot axis at or near the top surface of table 84. As a result, support frame 104 is pivotal about the top of table 84 to tilt blade 40. A portion of first support member 100 defines a gear segment 112. Table saw 10 includes a second worm gear control member 114, configured to engage and drive gear segment 112. Second worm gear control member 114 is attached to a handle 90. A user adjusts the tilt of blade 40 by turning the second worm gear control member via the handle. Alternatively, table saw 10 may be configured in other ways to adjust the tilt of the blade, such as are known to those of skill in the art.

Brake mechanism 28 includes a support brace 116 pivotally coupled to support frame 104. In the depicted embodiment, support brace 116 includes a lower fork structure 118 pivotally mounted onto a pivot pin 120. The pivot pin is supported by a collar 122 mounted on one of cross braces 106. Pivot pin 120 is aligned generally perpendicular to blade 40 so that support brace 116 pivots adjacent and parallel to the blade.

Support brace 116 also includes an upper fork structure 124 coupled to a shaft 126 that extends through the upper fork structure in a direction perpendicular to blade 40. Shaft 126 is adapted to support cartridge 80 and one or more brake pawls 60 adjacent the perimeter of blade 40. Alternatively, cartridge 80 may be omitted. The brake pawl is formed to define an orifice 128 adapted to slide onto, and rotate about, shaft 126. The brake pawl is positionable on shaft 126 to be selectively pivotal into the teeth of the blade. A restraining mechanism holds the brake pawl away from the blade against the urging of a biasing mechanism. When a dangerous condition is detected, a release mechanism releases the brake pawl from the restraining mechanism to pivot into the blade. Typically, the blade is stopped within approximately 2-5 milliseconds. Exemplary restraining mechanisms, biasing mechanisms, release mechanisms, cartridges and brake pawls are described above and in the incorporated references.

Brake mechanism 28 also includes a positioning member 130 configured to maintain the cartridge and brake pawl in a constant orientation adjacent the perimeter of the blade. In the exemplary embodiment, positioning member 130 includes a collar structure 132 adapted to fit around, and pivot about, a cylindrical channel 134 defined in arbor block 92. Collar structure 132 may be formed by two or more semi-cylindrical segments connectable together by bolts, etc. Such a construction would facilitate the positioning of the collar structure around the arbor block. Alternatively, the collar structure may be connected to the arbor block in any other suitable manner.

In any event, channel 134 is generally symmetrical about the elongate central axis of arbor 42. As a result, positioning member 130 is pivotal about the arbor. The positioning member also includes a fork structure 136 adapted to fit around shaft 126. Thus, the positioning member is coupled to support brace 116 and brake pawl 60 by shaft 126.

As arbor block 92 is pivoted to raise and lower the blade, positioning member 130 rotates around the arbor block in channel 134 and pivots support brace 116 toward and away from second support member 102, thereby maintaining shaft 126 at a constant radial distance from the arbor. In addition, positioning member 130 is rotationally coupled to cartridge 80 and/or brake pawl 60 so that the angle between positioning member 130 and brake pawl 60 does not change. Therefore, while the brake pawl and cartridge travel in an arc defined by pivot pin 120 and support brace 116, the orientation of the brake pawl relative to the arbor and the perimeter of the blade does not change as the height of the blade is adjusted.

In the exemplary embodiment, the cartridge and brake pawl are rotationally coupled to the positioning member by one or more nuts 138 adapted to engage threads on each end of shaft 126. When tightened, nuts 138 clamp the cartridge against fork structure 136 to produce a frictional contact between the cartridge and fork structure 136. Alternatively, the cartridge and/or brake pawl may be rotationally coupled to the positioning member in a variety of other ways, such as will be described in more detail below.

Since the radial distance and orientation of the brake pawl does not change relative to the blade, the brake pawl may be spaced very close to the edge of the blade to minimize the time required to pivot the brake pawl into the blade. The close spacing between the brake pawl and the blade edge is maintained throughout the full range of adjustment of the blade. Further, since the brake mechanism is mounted on support frame 104, the brake pawl also maintains a constant position when the blade is tilted.

Upon receipt of an activation signal from control subsystem 26, brake pawl 60 is pivoted into the teeth of blade 40 by a biasing mechanism (not shown) such as described above. The blade cuts into the brake pawl causing the brake pawl to pivot further into the blade until the blade binds and stops. The force of the moving blade is transferred through the brake pawl to shaft 126. The direction of the force on shaft 126 will vary depending on the height of the blade when the brake pawl is triggered.

It should be noted that in the exemplary embodiment, brake pawl 60 is positioned at the back of the blade (i.e., between the blade and the rear of table saw 10). It is believed that this arrangement will tend to cause blade 40 to move at least slightly downward as it rides down the face of the brake pawl. The clockwise (as viewed in FIG. 4) angular momentum of the blade may be at least partially transferred to positioning member 130 which links arbor 42 and shaft 126. Thus, shaft 126 is urged to move in a clockwise direction about the arbor. Since the shaft is constrained by support brace 116, the shaft tends to pivot generally horizontally toward first support member 100, thereby pushing the arbor downward. Typically, blade 40 is prevented from significant downward retraction during braking by the engagement of first worm gear control member 98 with gear segment 96. Alternatively, at least a portion of first worm gear control member 98 may be configured to release gear segment 96 to allow the arbor block to pivot downward, thereby retracting the blade below table 84.

Figure 7:
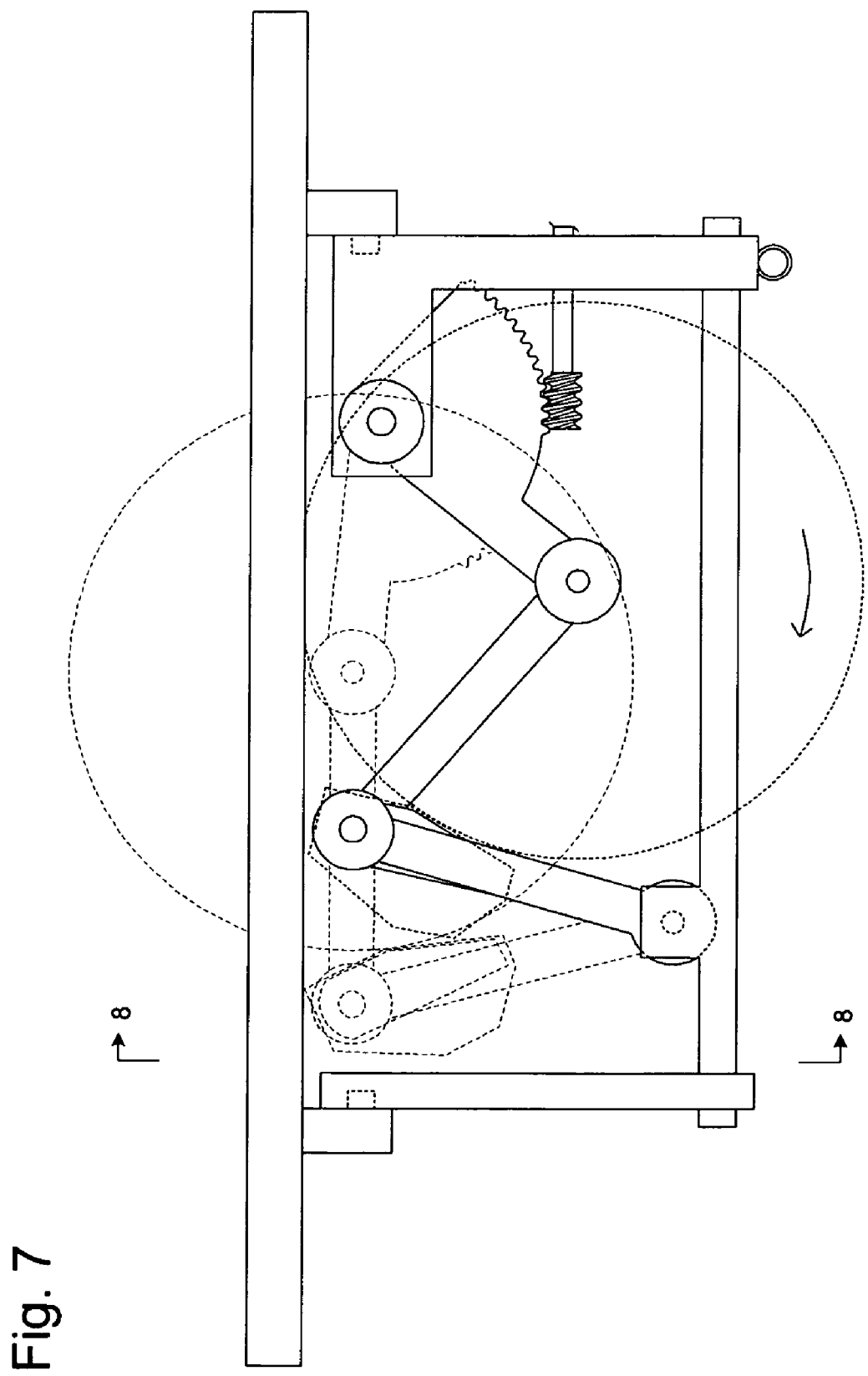
FIG. 7 is a fragmentary schematic side elevation of an alternative exemplary brake mechanism configured to stop the rotation of the blade on a table saw.

As best seen in FIGS. 5 and 6, shaft 126 is supported on only one side of the blade. While this facilitates the installation and removal of the brake pawl and cartridge, a substantial amount of bending force will be produced on the end of the shaft when the brake pawl pivots into the blade. By coupling to the shaft at two spaced-apart locations, upper fork structure 124 provides stability to the shaft during braking. Likewise, fork structure 136 is coupled to the shaft at two-spaced apart locations to provide increased stability. Alternatively, shaft 126 may be supported on both sides of blade 40. One example of such an embodiment is illustrated in FIGS. 7-9.

Figure 8:
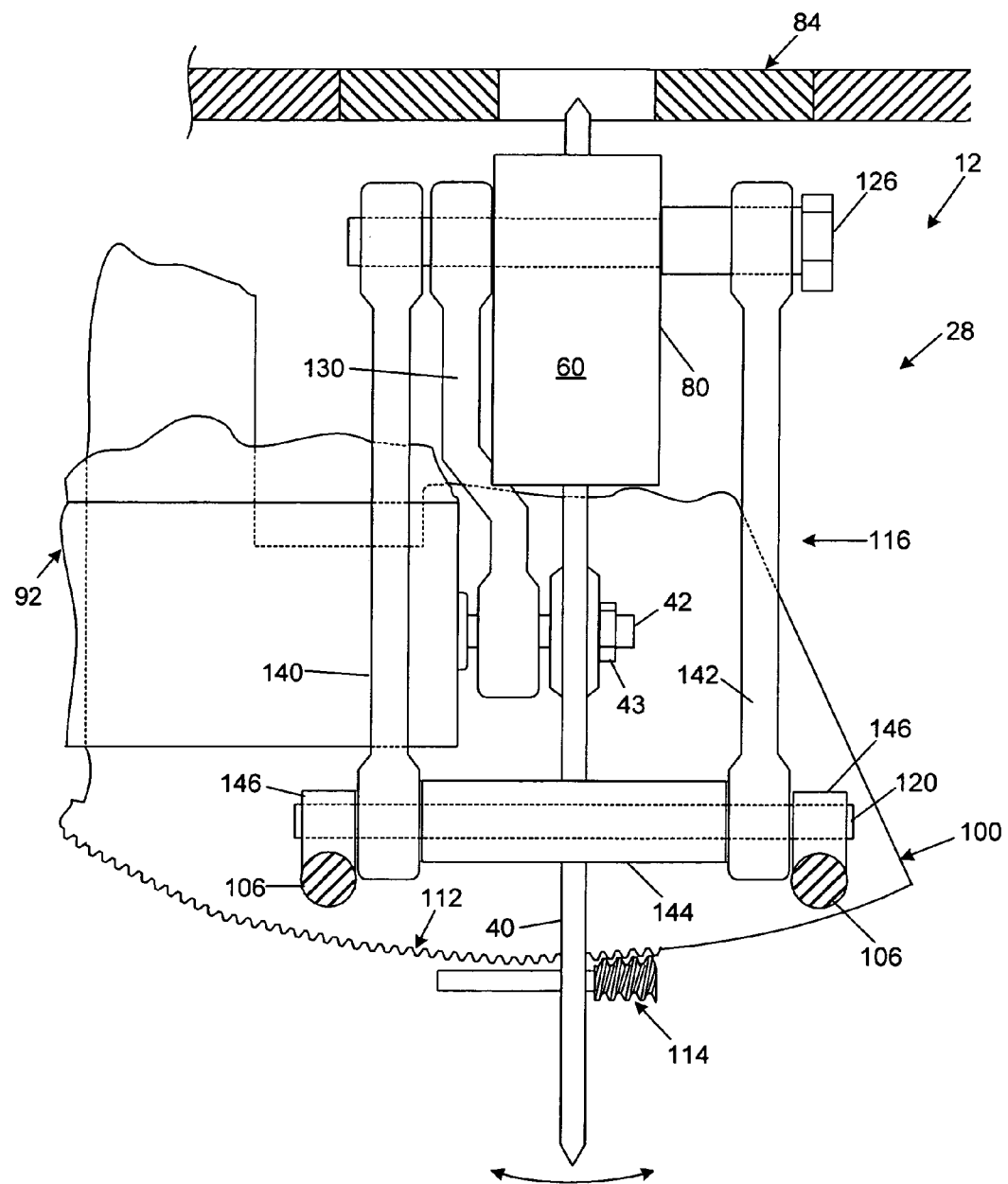
FIG. 8 is a fragmentary cross-sectional schematic view taken generally along line 8-8 in FIG. 7.
Figure 9:
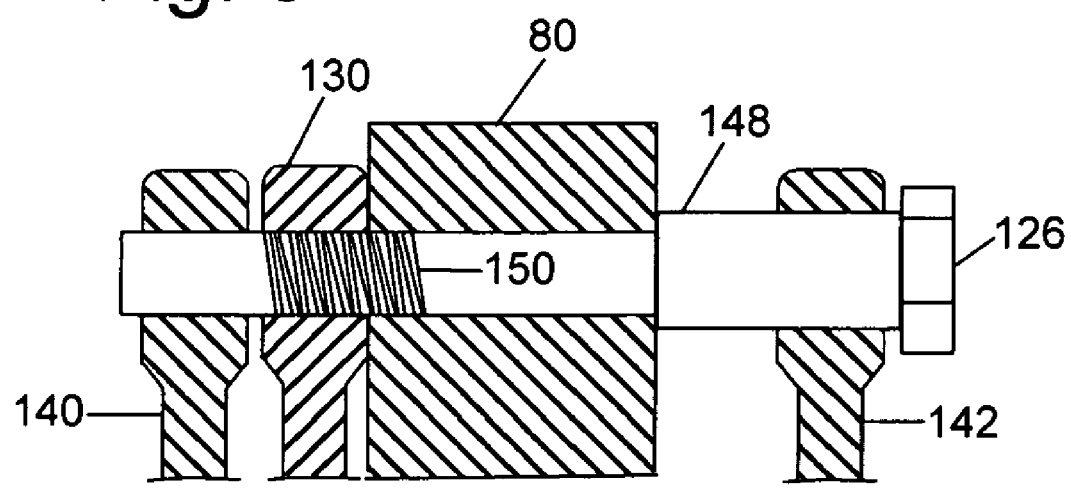
FIG. 9 is a magnified, cross-sectional schematic view showing engagement of the shaft with the support brace, positioning member and cartridge. For clarity, the shaft is not shown in cross-section.

As best seen in FIG. 8, support brace 116 includes an inner arm 140 and an outer arm 142. The upper end of inner arm 140 is coupled to shaft 126 on the side of the blade adjacent arbor block 92, while the upper end of outer arm 142 is coupled to the shaft on the side of the blade opposite the arbor block. Cartridge 80 and brake pawl 60 are mounted on shaft 126 between the inner and outer arms of support brace 116. The lower ends of the inner and outer arms are mounted on pivot pin 120. A spacer 144 disposed on the pivot pin maintains an equal distance between the upper and lower ends of the inner and outer arms. Pivot pin 120 is mounted in a pair of bearing structures 146, one on each cross brace 106.

The lower end of positioning member 130 is coupled to arbor 42 by a bearing (not shown) that allows the arbor to rotate relative to the positioning member. The upper end of the positioning member is connected to shaft 126. In the exemplary embodiment, positioning member 130 is connected to shaft 126 at a single point between inner arm 140 and outer arm 142. As shown in FIG. 9, the cartridge is clamped between the positioning member and a shoulder portion 148 of shaft 126. The shaft includes a threaded portion 150 which engages a threaded bore through the positioning member to rotationally couple the cartridge and brake pawl to the positioning member.

Alternatively, the upper end of the positioning member may include a fork structure adapted to connect to the shaft at two points on either side of inner arm 140. As a further alternative, the positioning member may include a collar structure such as described above to pivotally couple around a channel in arbor block 92. In such an embodiment, the upper fork structure of the positioning member may connect to the shaft on the side of the inner arm opposite the cartridge provided the cartridge is rotationally coupled to the positioning member by other means. Examples of such other mechanisms for rotationally coupling the cartridge and brake pawl to the positioning member are described below.

To replace a spent cartridge 80, shaft 126 is rotated to disengage threaded portion 150 from the positioning member. The shaft may then be drawn back through the cartridge. A new cartridge is then placed in position and the shaft is pushed through the cartridge, positioning member and inner arm 140. Finally, the shaft is rotated to engage threaded portion 150 with the positioning member.

Figure 10:
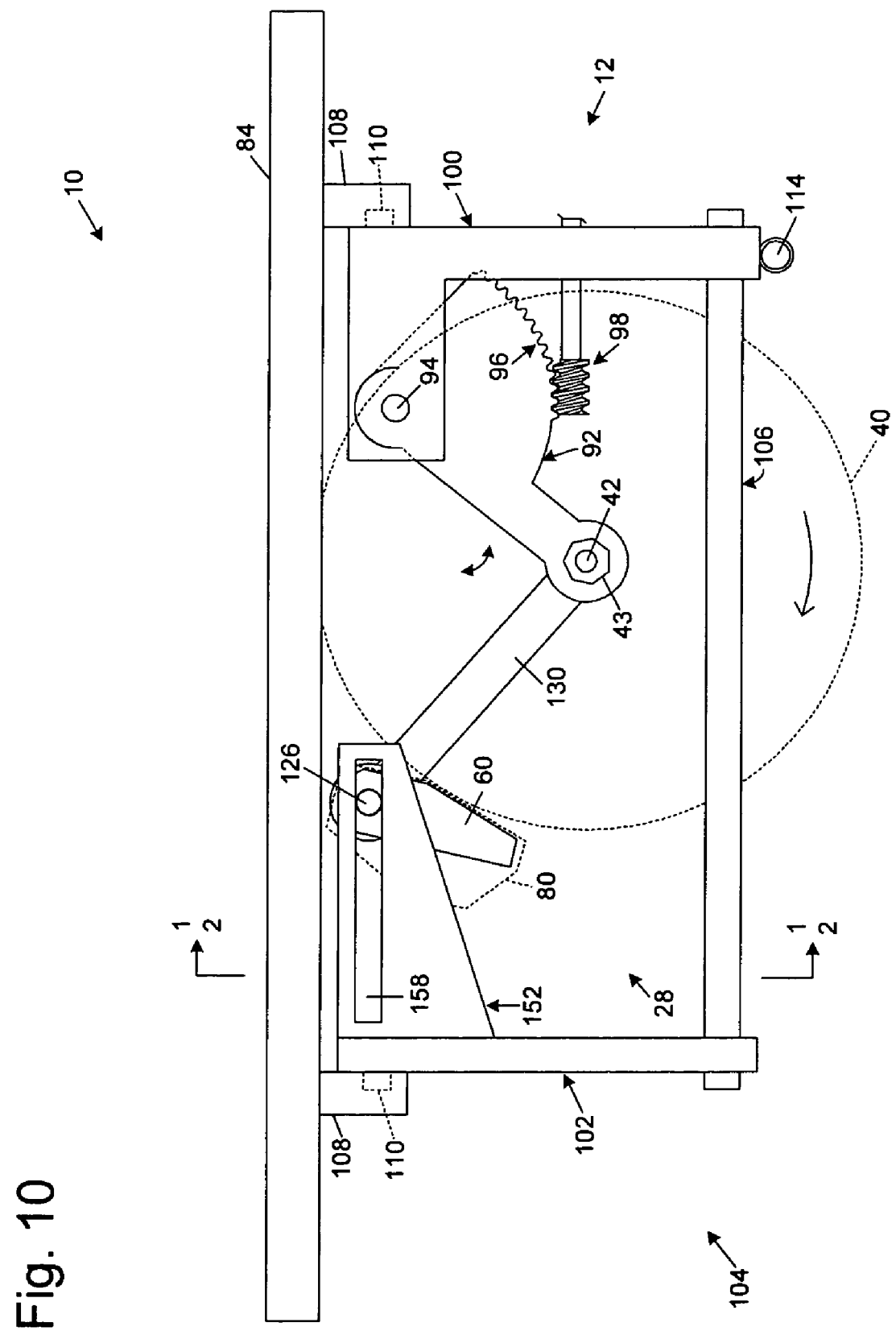
FIG. 10 is a fragmentary schematic side elevation of another alternative exemplary brake mechanism configured to stop rotation of the blade on a table saw.
Figure 11:
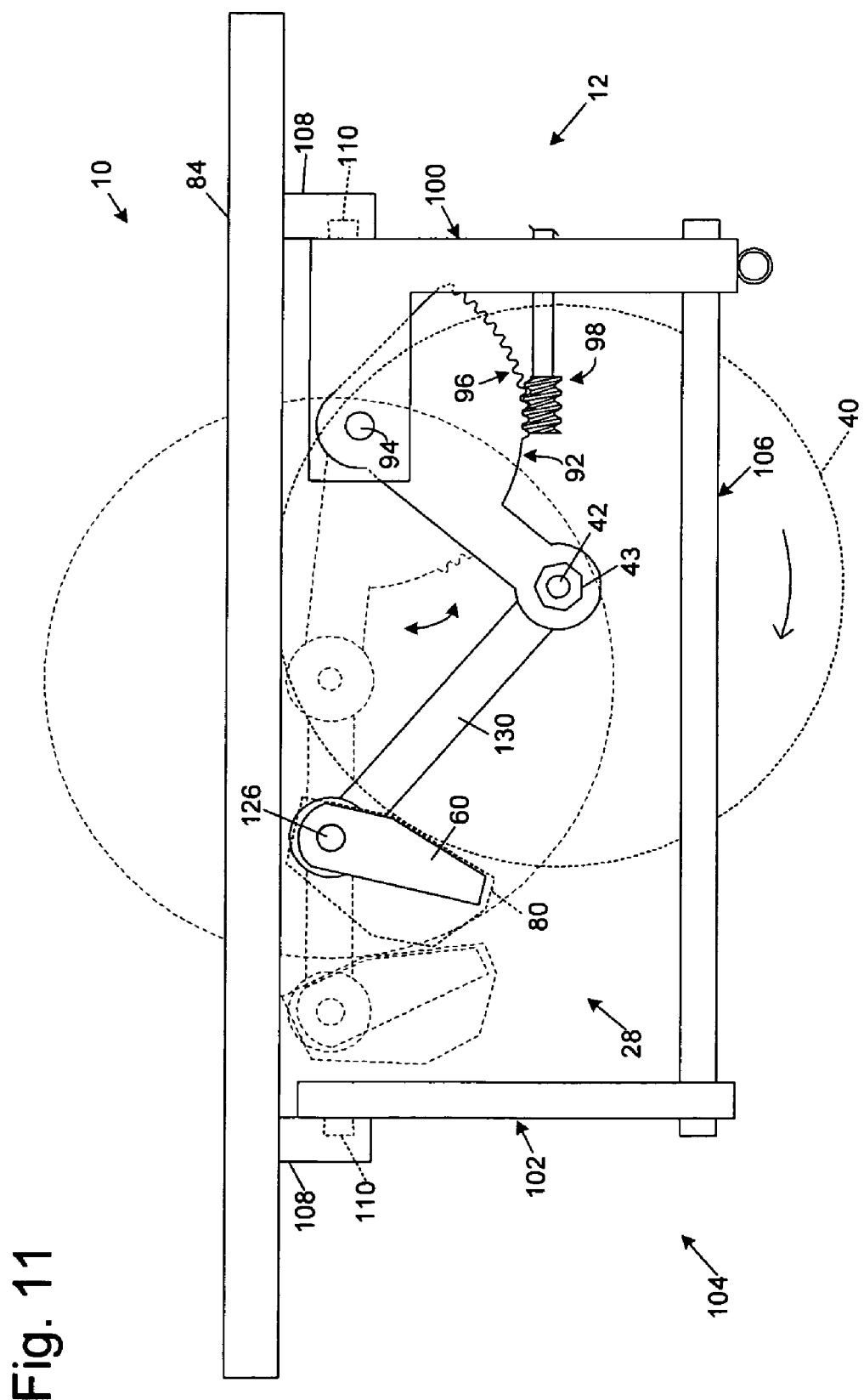
FIG. 11 is similar to FIG. 10 but shows the rack assembly removed to better illustrate the motion of the cartridge and brake pawl as the height of the blade is adjusted.
Figure 12:
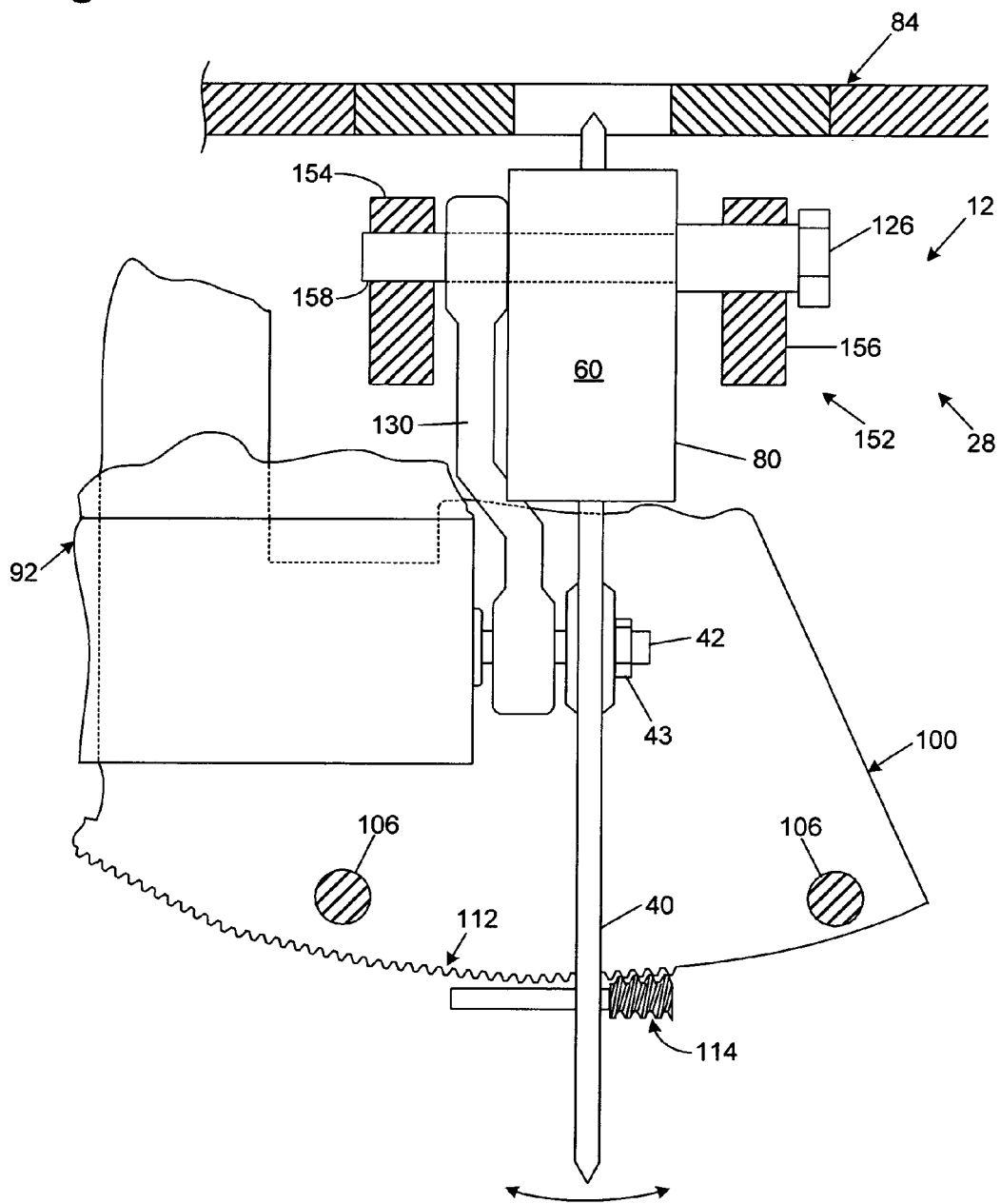
FIG. 12 is a fragmentary cross-sectional schematic view taken generally along line 12-12 in FIG. 10.

It will be appreciated that the embodiments described and depicted above may be modified in various ways within the scope of the invention. For example, one modification of the embodiment depicted in FIGS. 7-9 is illustrated in FIGS. 10-12. As shown, pivoting support brace 116 has been replaced by a rack assembly 152 mounted on second support member 102, and configured to slidably support shaft 126. Rack assembly 152 includes an inner bracket portion 154 and an outer bracket portion 156 extending outward from the second support member generally parallel to blade 40 and on either side of the blade. Each bracket portion defines a channel 158 that extends generally parallel to table 84. Each of channels 158 are sized to receive one of opposite ends of shaft 126 so that the shaft may slide within the channels as the blade is raised and lowered.

Positioning member 130 is coupled between arbor 42 and shaft 126 to maintain a constant radial distance between the shaft and the arbor. As described above, the cartridge and/or brake pawl is rotationally coupled to the positioning member to maintain a constant orientation between the brake pawl and the perimeter of the blade. Since rack assembly 152 is mounted to second support member 102, the rack assembly, cartridge and brake pawl are tilted with the blade. Thus, the brake pawl can be maintained in close proximity to the edge of the blade regardless of the position of the blade.

When a dangerous condition is detected and brake pawl 60 is pivoted into the blade, at least a portion of the force of the moving blade is transferred to rack assembly 152. It is believed that the angular momentum of the blade will tend to urge the blade to move downward as the blade climbs down the face of the brake pawl. The clockwise (as viewed in FIGS. 10 and 11) angular momentum of the blade is at least partially transferred to positioning member 130 which links arbor 42 and shaft 126. Thus, shaft 126 is urged to move in a clockwise direction about the arbor. Since the shaft is constrained to move horizontally by rack assembly 152, the shaft tends to move toward first support member 100, thereby pushing the arbor downward. As a result, brake mechanism 28 is configured not only to stop the rotation of the blade, but also to at least partially retract the blade away from the user's body. Typically, blade 40 is prevented from significant downward retraction by the engagement of first worm gear control member 98 with gear segment 96. Alternatively, at least a portion of first worm gear control member 98 may be configured to release gear segment 96 to allow the arbor block to pivot downward, thereby retracting the blade below table 84.

It will be appreciated that the embodiment depicted in FIGS. 10-12 may be modified in a variety of ways within the scope of the invention. For example, rack assembly 152 may be positioned to connect to shaft 126 on only one side of blade 40, similar to the embodiment depicted in FIG. 5. As another example, positioning member 130 may be coupled to pivot about the arbor block, similar to the embodiment depicted in FIGS. 5 and 6.

In each of the exemplary embodiments described above cartridge 80 and/or brake pawl 60 are rotationally coupled to the positioning member. This configuration maintains the brake pawl in a constant orientation relative to the perimeter of the blade as the blade is raised or lowered. In the exemplary embodiments, the cartridge is clamped against the positioning member to create a frictional coupling. Alternatively, the cartridge and/or brake pawl may be rotationally coupled to the positioning member in a variety of other ways as well.

Figure 14:
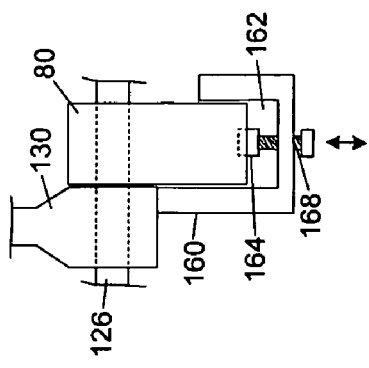
FIG. 14 is a rear view of the embodiment of FIG. 13.
Figure 15:
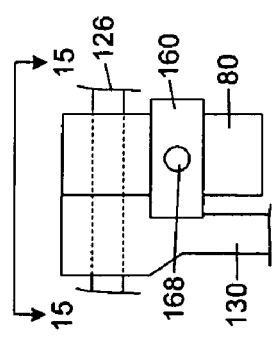
FIG. 15 is a top view of the embodiment of FIG. 13.
Figure 13:
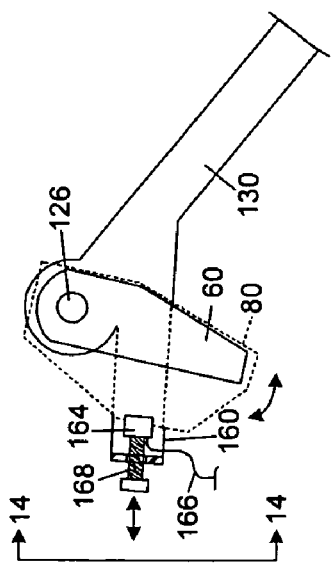
FIG. 13 is a fragmentary schematic side elevation of an alternative embodiment for rotationally coupling the cartridge and brake pawl to the positioning member.

For example, FIGS. 13-15 illustrate one alternative embodiment in which positioning member 130 includes a bracket 160 adapted to rotationally couple the cartridge and brake pawl to the positioning member, as well as align the brake pawl with blade 40. As shown, bracket 160 extends outward from the positioning member and generally parallel to the cartridge. A rear portion of the bracket forms a U-shaped enclosure 162 adapted to receive at least a portion of the cartridge. Thus, the cartridge is installed by sliding the cartridge onto shaft 126 and then rotating the cartridge counter-clockwise (as seen in FIG. 13) into U-shaped enclosure 162 until it engages an electrical connector 164.

Connector 164 is attached via a cable 166 to control subsystem 26 (not shown). The connector is configured to engage a mating connector (not shown) in the rear of cartridge 80 to electrically couple the cartridge to the control subsystem. Connector 164 is mounted on a set-screw 168 that is threaded through the rear of U-shaped enclosure 162. Thus, the user may adjust the position of the cartridge and brake pawl relative to the blade by turning set screw 168. Typically, the brake pawl is adjusted to be relatively close to the blade (e.g., ¼-inch, ⅛-inch, 1/16-inch, etc.) to minimize the stopping time. In any event, connector 164 engages the mating connector in the cartridge securely enough to prevent the cartridge from rotating relative to the positioning member. Alternatively, connector 164 may be omitted and set-screw 168 may engage the cartridge directly. In which case, the cartridge may be electrically coupled to the positioning member by some other mechanism.

Figure 17:
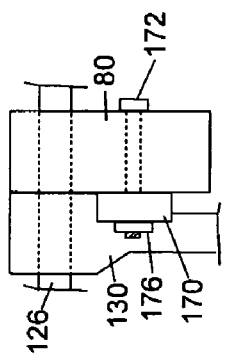
FIG. 17 is a rear view of the embodiment of FIG. 16.
Figure 16:
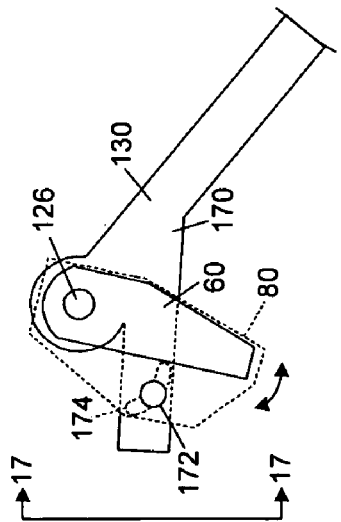
FIG. 16 is a fragmentary schematic side elevation of an alternative embodiment for rotationally coupling the cartridge and brake pawl to the positioning member.

FIGS. 16 and 17 show another alternative mechanism adapted to rotationally couple the cartridge and brake pawl to the positioning member. In this embodiment, positioning member 130 includes a bracket 170 that extends generally parallel to cartridge 80. The cartridge is slid onto shaft 126 against bracket 170. A locking screw 172 is inserted through a hole in the cartridge and into a circular track 174 formed in bracket 170. A wing nut 176 or similar device engages the end of locking screw 172 adjacent the bracket. Once the cartridge and brake pawl are rotated to the desired orientation relative to the blade, wing nut 176 is tightened to clamp the cartridge to the bracket.

Figure 18:
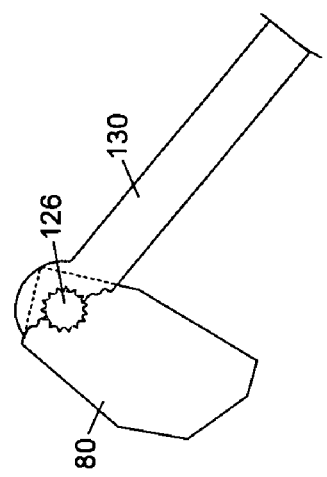
FIG. 18 is a fragmentary schematic side elevation of an alternative embodiment for rotationally coupling the cartridge and brake pawl to the positioning member.

Another alternative mechanism adapted to rotationally couple the cartridge and brake pawl to the positioning member is illustrated in FIG. 18. As shown, at least a portion of shaft 126 is serrated or otherwise non-circularly shaped (e.g., hexagonal, octagonal). The bore through positioning member 130 adapted to receive the shaft is similarly serrated or shaped so that shaft 126 is rotationally coupled to the positioning member. Likewise, the bore through cartridge 80 is serrated or shaped to grip the shaft and prevent rotation relative to the shaft and positioning member. In contrast, brake pawl 60 includes a circular bore adapted to rotate about the shaft when triggered. Prior to being triggered however, the brake pawl is held stationary relative to the cartridge and therefore rotates with the positioning member. Similarly, in embodiments where support brace is coupled to the shaft (e.g., such as shown in FIGS. 4-8), the upper end of the support brace includes a circular bore to rotate about the shaft. Alternatively, the shaft may be circular in cross-section where it is coupled to the support brace.

As described above, the present invention provides an improved safety system for use on power tools such as a table saw. The invention is configured to detect the occurrence of a dangerous condition and stop the motion of the blade before a user suffers a serious injury. Optionally, the safety system may be configured to retract the blade away from the user. In view of the several embodiments that have been described above, it will be appreciated that the present invention is not limited to any specific embodiments, but rather encompasses many different configurations, variations and modifications such as will be evident to those of skill in the art. Many such configurations, variations and modifications are described in more detail in the references incorporated above, as well as PCT Patent Application Serial No. PCT/US00/26812, filed Sep. 29, 2000; U.S. Provisional Patent Application Ser. No. 60/233,459, filed Sep. 18, 2000; U.S. Provisional Patent Application Ser. No. 60/225,210, filed Aug. 14, 2000; U.S. Provisional Patent Application Ser. No. 60/225,058, filed Aug. 14, 2000; U.S. Provisional Patent Application Ser. No. 60/225,057, filed Aug. 14, 2000; and U.S. Provisional Patent Application Ser. No. 60/157,340, filed Oct. 1, 1999.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A table saw comprising:
    a frame including a table defining a planar work surface, where the table has a front and a back;
    an arbor supported by the frame;
    a rotatable blade on the arbor and extendable up through the work surface;
    a feed direction extending parallel to the plane of the work surface from the front to the back of the table so that a user can place a work piece on the table in front of the blade and slide the work piece in the feed direction toward the back of the table to contact the blade and cut the work piece;
    an adjustment mechanism configured to selectively raise and lower the blade relative to the table without changing the angle of the blade relative to the work surface;
    a detection system to detect a dangerous condition between a person and the blade; and
    a reaction system configured to take a predetermined action to mitigate injury upon detection of the dangerous condition, where the reaction system has a component in a predetermined orientation relative to the blade, and where the component is configured to maintain its orientation relative to the blade as the blade is raised and lowered relative to the table.

2. The table saw of claim 1 where the predetermined action is to decelerate the blade.

3. The table saw of claim 1 where the dangerous condition is contact between a person and the blade.

4. The table saw of claim 1 where the dangerous condition is proximity between a person and the blade.

5. A table saw comprising:
a frame including a table defining a planar work surface, where the table has a front and a back;
an arbor supported by the frame;
a rotatable blade on the arbor and extendable up through the work surface;
a feed direction extending parallel to the plane of the work surface from the front to the back of the table so that a user can place a work piece on the table in front of the blade and slide the work piece in the feed direction toward the back of the table to contact the blade and cut the work piece;
an adjustment mechanism configured to selectively raise and lower the blade relative to the table without changing the angle of the blade relative to the work surface;
a detection system to detect a dangerous condition between a person and the blade; and
reaction means for mitigating injury upon detection of the dangerous condition, where the reaction means maintains a predetermined orientation relative to the blade as the blade is raised and lowered relative to the table.

* * * * *